United States Patent
Yodo

(10) Patent No.: US 9,576,689 B2
(45) Date of Patent: Feb. 21, 2017

(54) CRITICAL HEAT FLUX PREDICTION DEVICE, CRITICAL HEAT FLUX PREDICTION METHOD AND SAFETY EVALUATION SYSTEM

(75) Inventor: Tadakatsu Yodo, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 382 days.

(21) Appl. No.: 13/820,294

(22) PCT Filed: Aug. 12, 2011

(86) PCT No.: PCT/JP2011/068473
§ 371 (c)(1),
(2), (4) Date: Mar. 1, 2013

(87) PCT Pub. No.: WO2012/029533
PCT Pub. Date: Mar. 8, 2012

(65) Prior Publication Data
US 2013/0156142 A1 Jun. 20, 2013

(30) Foreign Application Priority Data
Sep. 3, 2010 (JP) ................... 2010-198248

(51) Int. Cl.
*G21C 17/00* (2006.01)
*G21D 3/04* (2006.01)
(Continued)

(52) U.S. Cl.
CPC ....... *G21D 3/04* (2013.01); *G21C 7/32* (2013.01); *G21C 17/00* (2013.01); *G21C 17/112* (2013.01); *Y02E 30/39* (2013.01)

(58) Field of Classification Search
CPC .................................................. G21C 17/112
(Continued)

(56) References Cited

U.S. PATENT DOCUMENTS 4,330,367 A * 5/1982 Musick .................... 376/245
5,084,229 A * 1/1992 Welsh ................ G21C 17/06
376/247
2010/0158185 A1 6/2010 Helmersson et al.

FOREIGN PATENT DOCUMENTS

JP 06-11588 A 1/1994
JP 2000-28726 A 1/2000
JP 2008-261693 A 10/2008

OTHER PUBLICATIONS

Kwon et al. Critical Heat Flux Function Approximation Using Genetic Algorithms, IEEE Transactions on Nuclear Science, vol. 52, No. 2, Apr. 2005, pp. 535-545.*

(Continued)

*Primary Examiner* — Jack W Keith
*Assistant Examiner* — Sharon M Davis
(74) *Attorney, Agent, or Firm* — Westerman, Hattori, Daniels & Adrian, LLP

(57) ABSTRACT

A critical heat flux prediction device, a critical heat flux prediction method, a safety evaluation system, and a core monitoring system using the safety evaluation system can predict critical heat flux in a core of a reactor with a high degree of accuracy by obtaining a correlation plot distribution representing a relation of critical heat flux on a thermal equilibrium quality based on experimental data, approximating a correlation plot distribution through a logistic function that is a model function in which critical heat flux is expressed by a function of a thermal equilibrium quality, and obtaining a critical heat flux correlation of critical heat flux and a thermal equilibrium quality.

2 Claims, 15 Drawing Sheets

PRESSURE: 7 MPa, MASS VELOCITY: 500 kg/m²s
CRITICAL HEAT FLUX CHARACTERISTIC ON
THERMAL EQUILIBRIUM QUALITY FORMULA (1)

(51) Int. Cl.
*G21C 7/32* (2006.01)
*G21C 17/112* (2006.01)

(58) Field of Classification Search
USPC .................................................. 376/244, 254
See application file for complete search history.

(56) References Cited

OTHER PUBLICATIONS

Janssen, E. "Nine-Rod Critical Heat Flux Investigation, Steam-Water at 600 to 1400 psia Final Summary Report" GEAP-5616, Apr. 1968.*
Japanese Notice of Allowance dated Sep. 30, 2014, issued in corresponding Japanese Application No. 2010-198248; w/English Translation. (3 pages).
Written Opinion of International Search Report of PCT/JP2011/068473 dated Oct. 11, 2011; English translation (6 pages).
D.C. Groeneveld, et al., "The 2006 CHF look-up table", Nuclear Engineering and Design, vol. 237, 2007, pp. 1909-1922, cited in the specification.
Written Opinion of International Search Report of PCT/JP2011/068473 dated Oct. 11, 2011.
MAPI-1075, (MIRC-1), 2006, w/ concise explanation, and cited in the specification.
Extended (Supplementary) European Search Report dated Dec. 2, 2016, issued in counterpart European Patent Application No. 11821551.6. (7 pages).

* cited by examiner

PRESSURE: 7 MPa, MASS VELOCITY: 500 kg/m²s
CRITICAL HEAT FLUX CHARACTERISTIC ON
THERMAL EQUILIBRIUM QUALITY FORMULA (1)

PRESSURE: 14 MPa, MASS VELOCITY: 2500 kg/m²s
CRITICAL HEAT FLUX CHARACTERISTIC ON
THERMAL EQUILIBRIUM QUALITY FORMULA (1)

EXPERIMENTAL CHARACTERISTIC OF CRITICAL
HEAT FLUX ON THERMAL EQUILIBRIUM QUALITY
(LOOK-UP TABLE OF GROENEVELD)

CRITICAL HEAT FLUX PREDICTION DEVICE, CRITICAL HEAT FLUX PREDICTION METHOD AND SAFETY EVALUATION SYSTEM

FIELD

The present invention relates to a critical heat flux prediction of predicting critical heat flux of a fuel rod used in a core of a reactor and a safety evaluation of evaluating a thermal margin of the fuel rod of the reactor.

BACKGROUND

For example, a pressurized water reactor (PWR) and a boiling water reactor (BWR) use light water as a reactor coolant (hereinafter, referred to as a "coolant") and a neutron moderator. At the time of a normal operation of a reactor, the coolant lowers the clad temperature by cooling the cladding tube of the fuel rod.

In a heating surface between the cladding tube and the coolant, a non-boiling region is small in heat flux and sufficiently cooled. As the heat flux increases, a nuclear boiling region is increased in which vapor generated in the heating surface between the cladding tube and the coolant is converted into air bubbles and flows. In the nuclear boiling region, heat can be more efficiently transferred from the cladding tube to the coolant due to generation and agitation actions of air bubbles. As the heat flux further increases, the heating surface between the cladding tube and the coolant is covered with the vapor, heat is hardly transferred from the cladding tube to the coolant. A region in which the heating surface is covered with the vapor and so heat is hardly transferred from the cladding tube to the coolant as described above is referred to as "film boiling." When transition from nuclear boiling to film boiling is made, the clad temperature steeply increases. Here, heat flux with which the heat transfer from the cladding tube to the coolant is lowered and the clad temperature starts to steeply increase is referred to as "critical heat flux."

In a core thermal-hydraulic design, in order to prevent the clad temperature from steeply increasing, it is important to predict the critical heat flux. In the core thermal-hydraulic design, it is also important to compare the critical heat flux with actual heat flux inside the core and evaluate a thermal margin of a fuel rod. In the prediction of the critical heat flux, an experimental correlation based on experimental data obtained by simulating a fuel rod is used as a critical heat flux correlation.

Patent Literature 1 and Non-Patent Literature 1 disclose a critical heat flux correlation according to a related art. In the critical heat flux correlation according to the related art, for example, a linear function is used as a function of critical heat flux on a thermal equilibrium quality as stated in Paragraph [0016] of Patent Literature 1. Non-Patent Literature 2 discloses a look-up table (LUT) generated by organizing critical heat flux (CHF) of single-tube experimental data. FIG. 18 is an explanatory diagram obtained by deriving and plotting a "relation of an experimental characteristic (a look-up table of Groeneveld) of critical heat flux on a thermal equilibrium quality" based on Non-Patent Literature 2.

CITATION LIST

Patent Literature

Patent Literature 1: Japanese Laid-open Patent Publication No. 2008-261693

Non-Patent Literature

Non-Patent Literature 1: MAPI-1075 4$^{th}$ Edition, Regarding Mitsubishi New DNB Correlation (MIRC-1) (2006)

Non-Patent Literature 2: D. C. Groeneveld, et al., The 2006 CHF Look-Up Table, Nuclear Engineering and Design, Vol. 237, (2007), pp. 1909-1922

SUMMARY

Technical Problem

However, as illustrated in FIG. 18, with respect to the "relation of an experimental characteristic (a look-up table of Groeneveld) of critical heat flux on a thermal equilibrium quality" based on Non-Patent Literature 2, in the critical heat flux correlation of the related art, there is a region in which a prediction of critical heat flux is not appropriate. In the critical heat flux correlation of the related art, the critical heat flux is approximated by a linear function of a thermal equilibrium quality. However, the relation of the critical heat flux on the thermal equilibrium quality is actually non-linear. Further, as illustrated in FIG. 18, the relation of the critical heat flux on the thermal equilibrium quality is close to zero (0) in a high thermal equilibrium quality region. Further, in the relation of the critical heat flux on the thermal equilibrium quality, there is case in which an inflection point is shown in a low thermal equilibrium quality region. The linear function which is the critical heat flux correlation of the related art is limited to a thermal equilibrium quality range representing linear behavior when an attempt to hold a prediction accuracy of critical heat flux is made. In predicting the critical heat flux, the critical heat flux is required to be predicted with a high degree of accuracy even when a thermal equilibrium quality is extensive.

The present invention is made in light of the foregoing, and directed to provide a critical heat flux prediction device, a critical heat flux prediction method, a safety evaluation system, and a core monitoring system, which are capable of predicting critical heat flux with a high degree of accuracy even when the thermal equilibrium quality is extensive.

Solution to Problem

According to a first aspect of the present inventions in order to solve the above-mentioned problems and achieve the object, there is provided a critical heat flux prediction device, including: a storage unit that stores experimental data including a thermal equilibrium quality decided based on sampled critical heat flux and an experimental condition; an experimental data plotting unit that obtains a correlation plot distribution representing a relation of critical heat flux on a thermal equilibrium quality based on the experimental data; and a critical heat flux correlation calculating unit that obtains a correlation of the critical heat flux and the thermal equilibrium quality by approximating the correlation plot distribution by a logistic function that is a model function in which the critical heat flux is expressed by a function of the thermal equilibrium quality.

According to the critical heat flux prediction device of the present invention, the critical heat flux can be predicted with a high degree of accuracy even when the thermal equilibrium quality is extensive.

According to the first aspect of the present invention, there is provided the critical heat flux prediction device, wherein the logistic function is the following Formula (1), where q" is critical heat flux, x is a thermal equilibrium quality, and A, K, and C are coefficients.

$$q'' = \frac{A}{1 + \exp(-K((1-x) - C))} \quad (1)$$

Further, in the critical heat flux prediction device according to the invention, for example, a non-linear correlation plot distribution having an inflection point or a convergence curve can be approximated using a logistic function in which critical heat flux is expressed by a function of a thermal equilibrium quality.

According to a second aspect of the present invention, there is provided a critical heat flux prediction method, including: acquiring experimental data including a thermal equilibrium quality decided based on sampled critical heat flux and an experimental condition; obtaining a correlation plot distribution representing a relation of critical heat flux on a thermal equilibrium quality based on the experimental data; and obtaining a correlation of the critical heat flux and the thermal equilibrium quality by approximating the correlation plot distribution by a logistic function that is a model function in which the critical heat flux is expressed by a function of the thermal equilibrium quality.

According to the critical heat flux prediction method of the present invention, the critical heat flux can be predicted with a high degree of accuracy even when the thermal equilibrium quality is extensive.

According to the second aspect of the present inventions, there is provided the critical heat flux prediction method, wherein the logistic function is the following Formula (1), where q" is critical heat flux, x is a thermal equilibrium quality, and A, K, and C are coefficients.

$$q'' = \frac{A}{1 + \exp(-K((1-x) - C))} \quad (1)$$

Further, in the critical heat flux prediction method according to the invention, for example, a non-linear correlation plot distribution having an inflection point or a convergence curve can be approximated using a logistic function in which critical heat flux is expressed by a function of a thermal equilibrium quality.

According to a third aspect of the present invention, there is provided a safety evaluation system, including: a core condition calculating unit that performs state analysis of a reactor; a sub-channel analyzing unit that obtains three-dimensional (3D) fluid behavior inside a core of the reactor according to the state analysis of the reactor; a critical heat flux ratio calculating unit that calculates a critical heat flux ratio of a fuel rod that is thermally harshest in the core as a minimum critical heat flux ratio based on the 3D fluid behavior; and a safety determination evaluating unit that performs a safety evaluation by comparing the minimum critical heat flux ratio with an allowable limit value, wherein a logistic function in which critical heat flux is expressed by a function of the thermal equilibrium quality is used as a critical heat flux correlation for obtaining the critical heat flux ratio.

In addition, according to the safety evaluation system of the present invention, the thermal margin of the fuel rod of the reactor can be determined with a high degree of accuracy.

According to the third aspect of the present inventions, there is provided the safety evaluation system, wherein the logistic function is the following Formula (1), where q" is critical heat flux, x is a thermal equilibrium quality, and A, K, and C are coefficients.

$$q'' = \frac{A}{1 + \exp(-K((1-x) - C))} \quad (1)$$

Further, in the safety evaluation system according to the invention, the critical heat flux can be predicted with a high degree of accuracy through a logistic function in which critical heat flux is expressed by a function of a thermal equilibrium quality even when the thermal equilibrium quality is extensive. Since the critical heat flux can be predicted with a high degree of accuracy, the minimum critical heat flux ratio can be also predicted with a high degree of accuracy.

According to a fourth aspect of the present inventions in order to solve the above-mentioned problems and achieve the object, there is provided a core monitoring system, including: a measuring device that measures measurement data of a reactor; a plant control device that controls the reactor; and the safety evaluation system, wherein the safety evaluation system performs a safety evaluation by comparing a minimum critical heat flux ratio calculated based on the measurement data with an allowable limit value, and the plant control device controls the reactor based on the safety evaluation.

In the core monitoring system according to the present invention, the reactor can be safely controlled at the time of the normal operation of the reactor and at the time of the anticipated operation occurrences.

Advantageous Effects of Invention

In the critical heat flux prediction device, the critical heat flux prediction method, the safety evaluation system, and the core monitoring system according to the present invention, there are effects by which the critical heat flux can be predicted with a high degree of accuracy even when the thermal equilibrium quality is extensive.

DESCRIPTION OF EMBODIMENTS

Hereinafter, the invention will be described in detail with reference to the accompanying drawings. The invention is not limited to the following embodiments. Further, components which are replaceable and obvious to be replaced while maintaining identity of the invention are included as components of this embodiment. In addition, a device, a system, a method, and a modified example described in this embodiment may be arbitrarily combined within a range that is obvious by those skilled in the art.

First Embodiment

Figure 1:
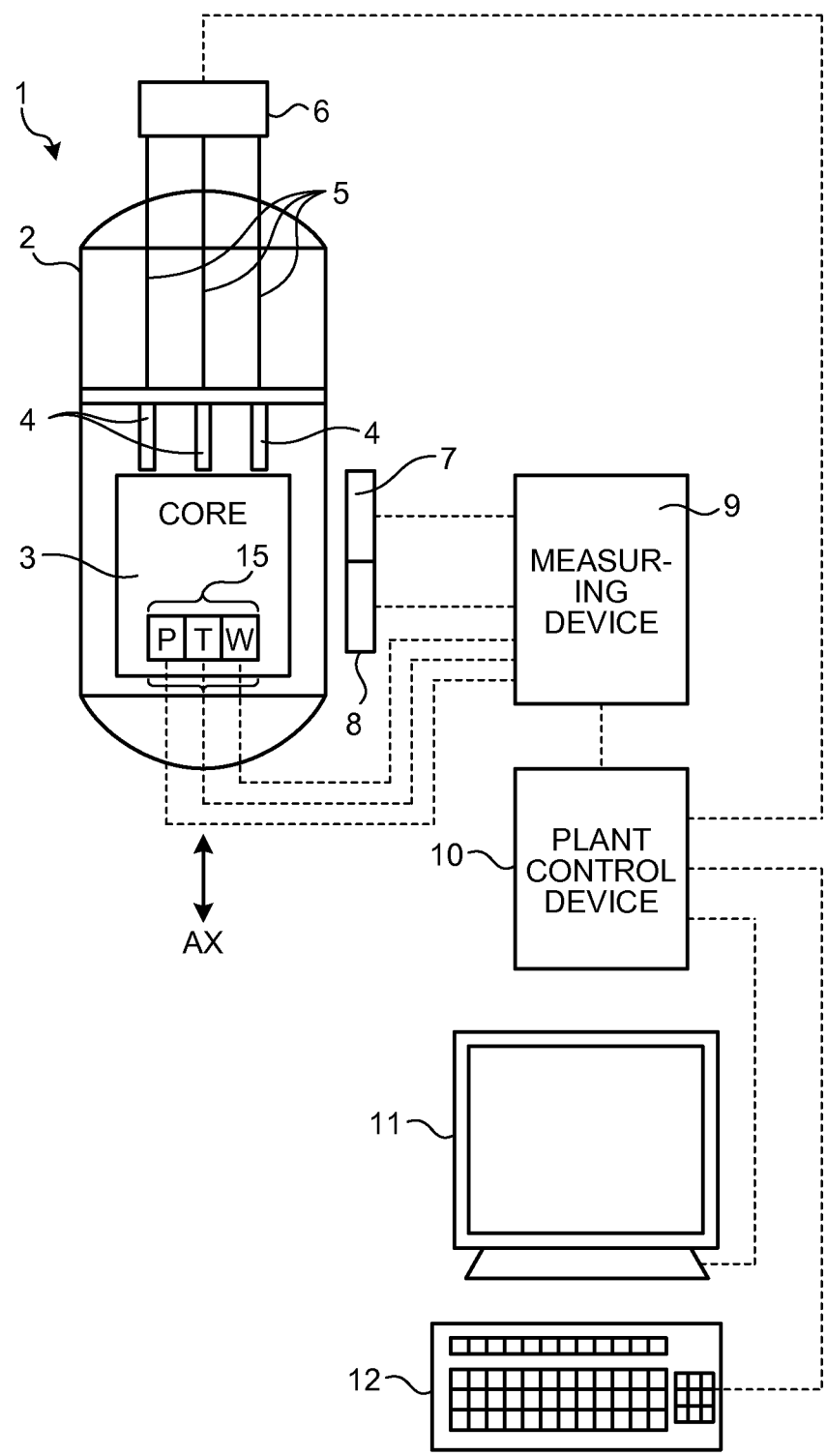
FIG. 1 is a conceptual diagram of a reactor having a core monitoring system according to a first embodiment.
Figure 2:
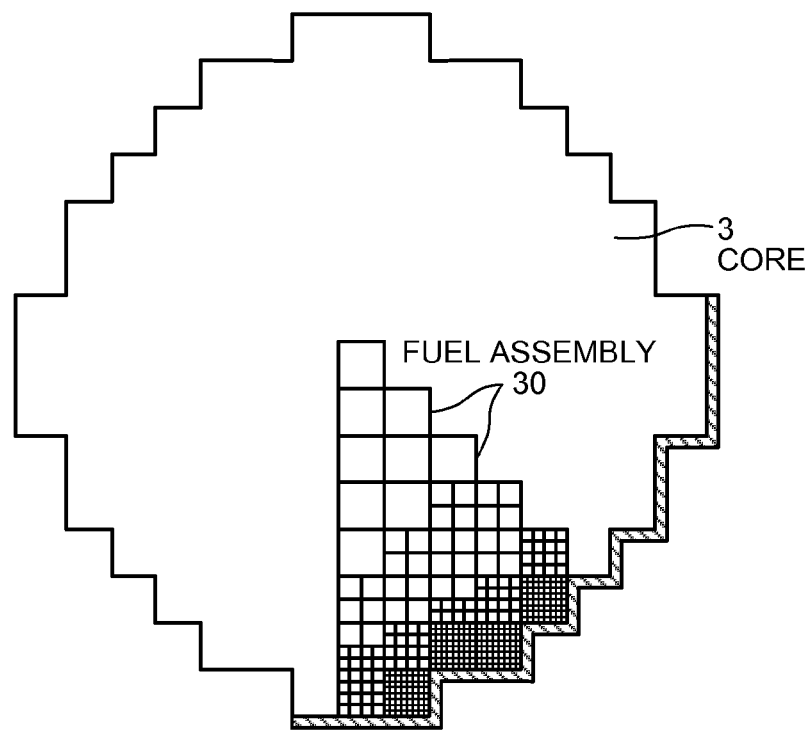
FIG. 2 is an explanatory diagram for schematically describing a core according to the first embodiment.
Figure 3:
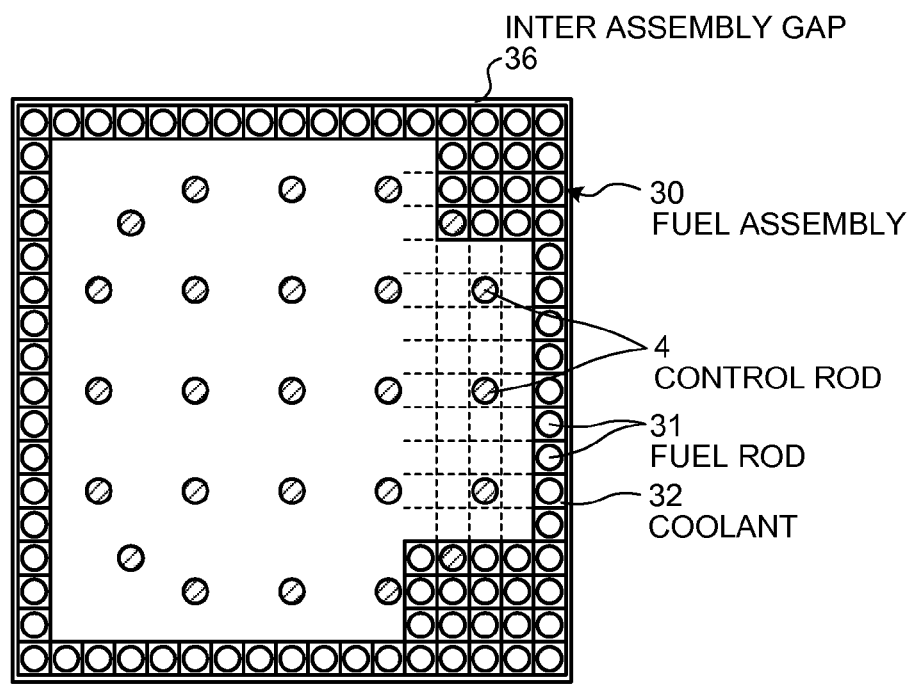
FIG. 3 is an explanatory diagram for schematically describing a fuel assembly according to the first embodiment.
Figure 4:
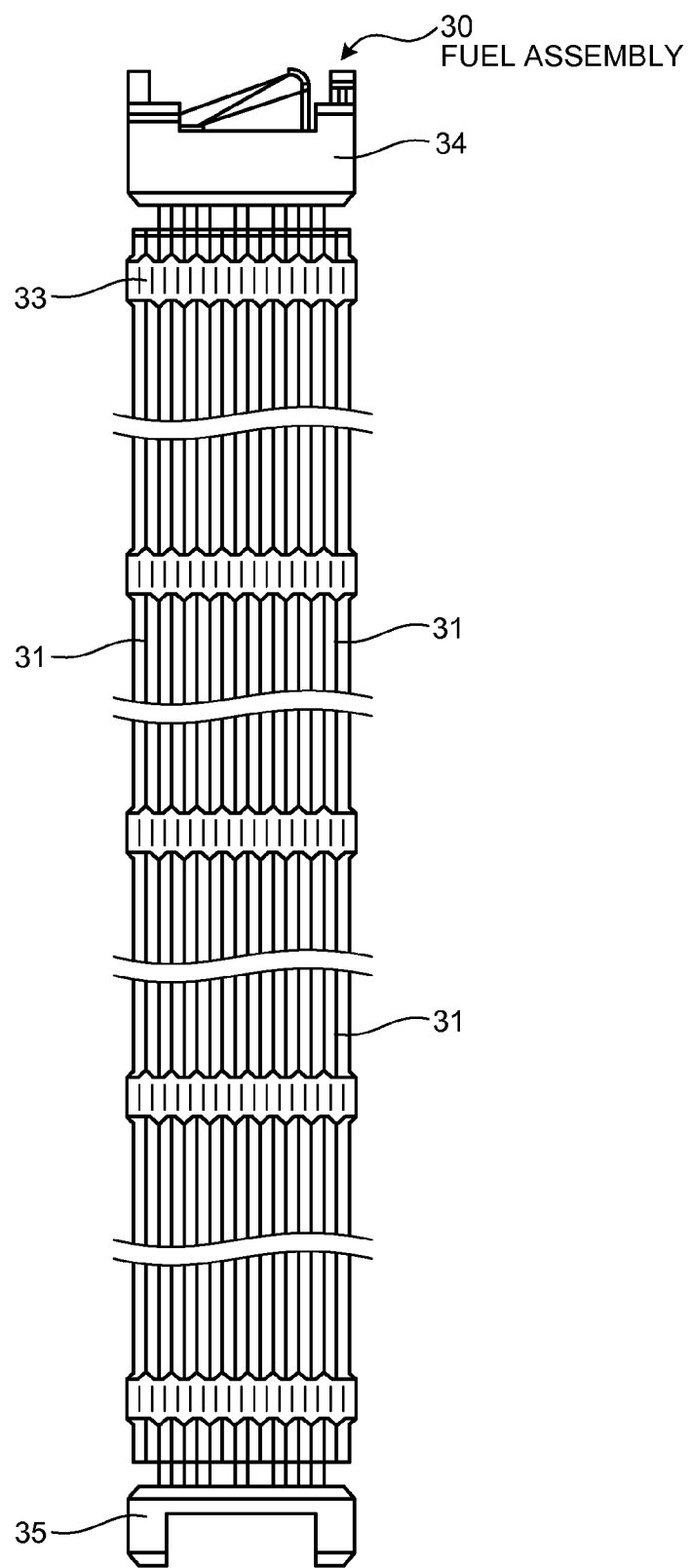
FIG. 4 is an explanatory diagram for schematically describing a fuel assembly according to the first embodiment.
Figure 5:
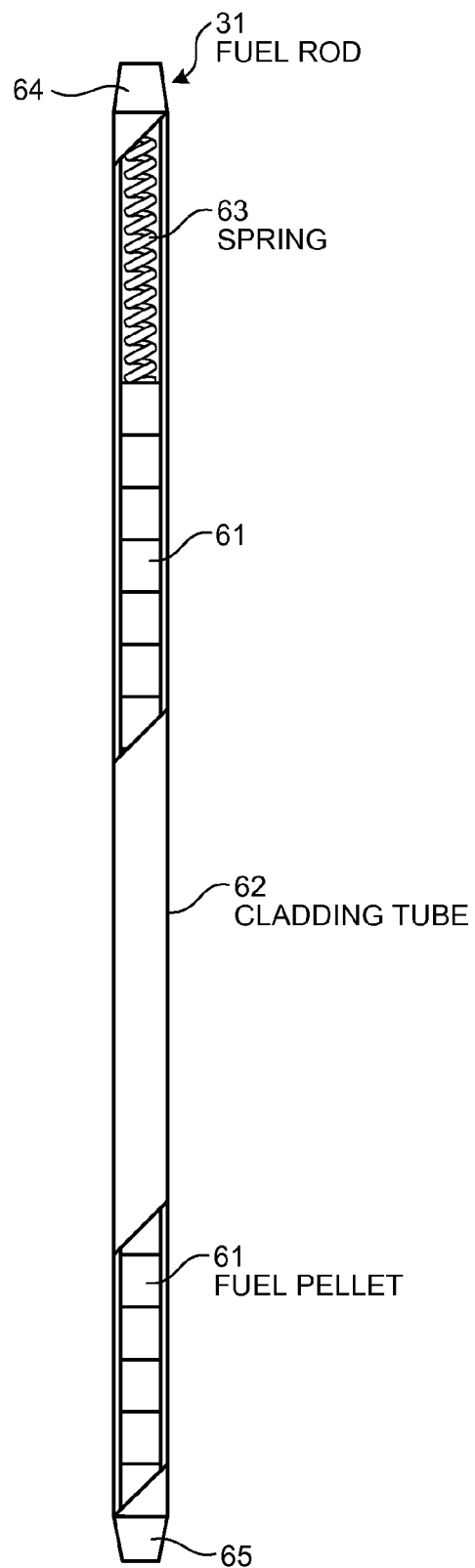
FIG. 5 is an explanatory diagram for schematically describing a fuel rod according to the first embodiment.

FIG. 1 is a conceptual diagram of a reactor. FIG. 2 is an explanatory diagram schematically illustrating a core. FIGS. 3 and 4 are explanatory diagrams schematically illustrating a fuel assembly. FIG. 5 is an explanatory diagram schematically illustrating a fuel rod.

A reactor 1 illustrated in FIG. 1 is a pressurized water reactor (PWR). The reactor 1 includes a core 3 in a pressure vessel 2. In order to control fission reaction of the core 3, the reactor 1 includes a plurality of control rods 4. The control rod 4 is coupled with a control rod control device 6 via a coupling rod 5. The control rod 4 is controlled by the control rod control device 6 such that the control rod 4 is inserted into or removed from the core 3. A moving direction of the control rod 4 is parallel to an axis AX of the reactor 1 (that is, an axis of the core 3). The reactor 1 includes an upper core outside neutron flux detector 7 and a lower core outside neutron flux detector 8. A plant control device 10 is configured to exchange control data with the control rod control device 6 or to transmit or receive a command to or from the control rod control device 6. The plant control device 10 includes a display unit 11 such as a liquid crystal display (LCD) panel or a cathode ray tube (CRT) and an input unit 12 such as a keyboard. The plant control device 10 also functions as a core monitoring system into which a safety evaluation system is incorporated.

As illustrated in FIG. 2, the core 3 includes a plurality of fuel assemblies 30, and the fuel assemblies 30 are arranged in a geometric form to maintain symmetry of 90 degree. Exchange of fuel is performed in units of the fuel assemblies 30. As illustrated in FIG. 3, each fuel assembly 30 includes a plurality of fuel rods 31 in an inter assembly gap 36. The inside of the fuel assembly 30 is filled with a coolant 32. The fuel assembly 30 is configured such that the plurality of control rods 4 are inserted into the fuel assembly 30. An inserting direction of the control rod 4 is parallel to the fuel rod 31. As illustrated in FIG. 4, the fuel assembly 30 is configured such that the plurality of fuel rods 31 are bound by a support grid 33 in a grid form. An upper nozzle 34 is fixed to an upper end portion of the fuel assembly 30, whereas a lower nozzle 35 is fixed to a lower end portion of the fuel assembly 30. The fuel assembly 30 according to the present embodiment has a 17×17 array.

As illustrated in FIG. 5, the fuel rod 31 includes a fuel pellet 61 therein. The fuel pellet 61 is one in which uranium dioxide containing uranium 235 concentrated to 5% or less as a fissionable material is firmly shaped in a pellet form. The fuel rod 31 is formed such that a cladding tube 62 is made of a zirconium alloy, the inside thereof is filled with a predetermined number of fuel pellets 61, the fuel pellets 61 are pressed by a spring 63 mounted to an upper part, the inside thereof is filled with helium gas, and in this state, end plugs 64 and 65 are fixed to an upper end portion and a lower end portion, respectively. Since the fuel rod 31 is surrounded by the coolant 32 as illustrated in FIG. 3, the coolant 32 cools the cladding tube 62 of the fuel rod 31 and lowers the temperature of the cladding tube 62.

In the fuel assembly 30 of the pressurized water reactor (PWR), the coolant 32 flows around the cladding tube 62 of the fuel rod 31, and boiling bubbles are generated near the wall surface of the cladding tube 62. When the heat flux increases, the boiling bubbles increase. When the whole cladding tube 62 is covered with the boiling bubbles, heat transfer from the cladding tube 62 to the coolant 32 starts to be lowered. Here, the heat flux with which the heat transfer from the cladding tube to the coolant is lowered and the clad temperature starts to steeply increases is referred to as "critical heat flux." In the core thermal-hydraulic design, in order to prevent the clad temperature from steeply increasing, it is important to predict the critical heat flux. Further, in the core thermal-hydraulic design, it is also important to compare the critical heat flux with the actual heat flux inside the core and evaluate the thermal margin of the fuel rod. The critical heat flux is obtained using an experimental formula based on experimental data obtained by simulating a real reactor as a critical heat flux correlation. Next, a critical heat flux prediction device that predicts the critical heat flux using the critical heat flux correlation and a safety evaluation system that performs safety evaluation using the critical heat flux correlation will be described.

Figure 6:
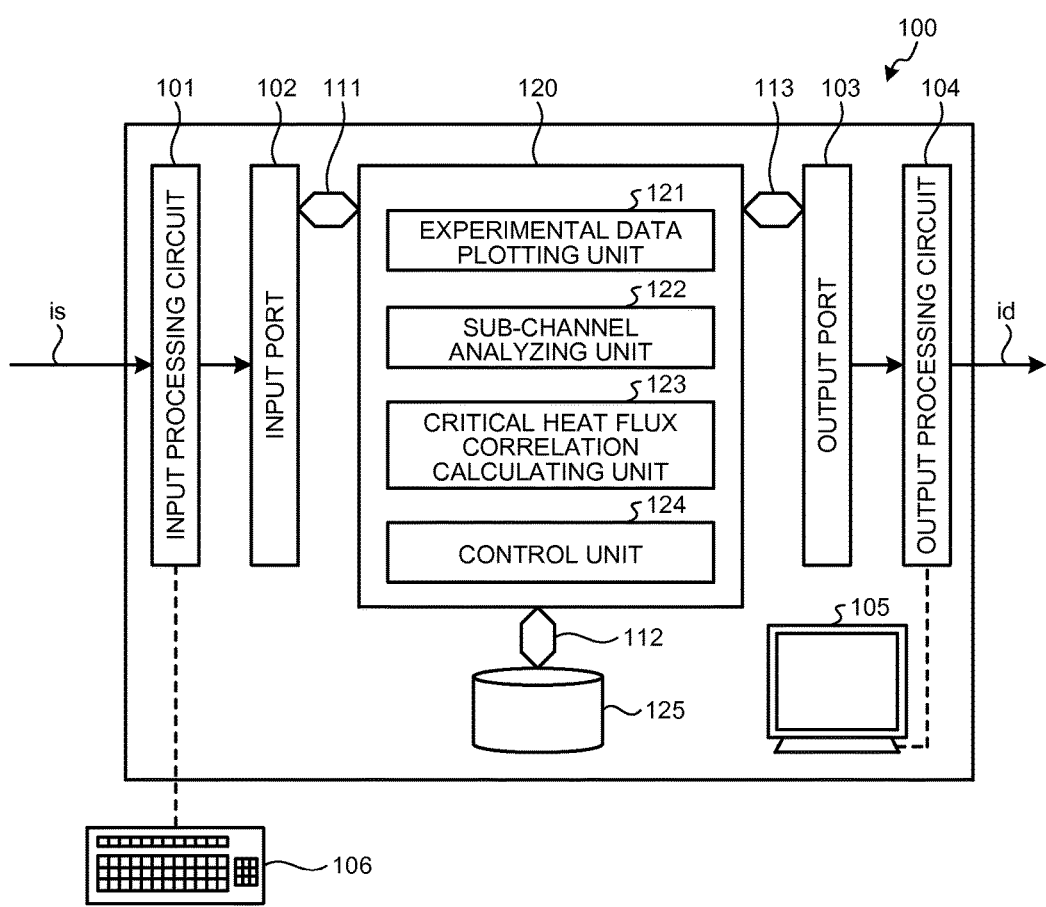
FIG. 6 is an explanatory diagram for describing a critical heat flux prediction device according to the first embodiment.

FIG. 6 is an explanatory diagram for describing a critical heat flux prediction device that predicts the critical heat flux using the critical heat flux correlation. As illustrated in FIG. 6, a critical heat flux prediction device 100 includes an input processing circuit 101, an input port 102, a processing unit 120, a storage unit 125, an output port 103, an output processing circuit 104, a display unit 105, and an input unit 106 such as a keyboard which is disposed as necessary. For example, the processing unit 120 may be configured such that a central processing unit (CPU) is combined with a memory. The processing unit 120 includes an experimental data plotting unit 121, a sub-channel analyzing unit 122, a critical heat flux correlation calculating unit 123, and a control unit 124. Of these, the experimental data plotting unit 121, the sub-channel analyzing unit 122, and the critical heat flux correlation calculating unit 123 are portions that execute a critical heat flux prediction method according to the first embodiment.

The processing unit 120, the storage unit 125, the input port 102, and the output port 103 are connected through buses 111 to 113. The experimental data plotting unit 121, the sub-channel analyzing unit 122, and the critical heat flux correlation calculating unit 123 that configure the processing unit 120 of the critical heat flux prediction device 100 are configured to exchange control data with each other or transmit or receive a command to or from each other through the buses 111 to 113 and the control unit 124.

The input port 102 is connected to the input processing circuit 101. An output signal is from a sensor of an experiment device which will be described later is connected to the input processing circuit 101. The signal is output from the sensor is converted into a signal which can be used by the processing unit 120 through a noise filter, an analog/digital (A/D) converter included in the input processing circuit 101 and then transmitted to the processing unit 120 through the input port 102. As a result, the processing unit 120 can acquire information necessary to predict the critical heat flux.

The output port 103 is connected to the output processing circuit 104. The display unit 105 and an external output terminal are connected to the output processing circuit 104. The output processing circuit 104 includes a display unit control circuit, a signal amplifying circuit, and the like. The output processing circuit 104 outputs a critical heat flux correlation calculated by the processing unit 120 as a display signal to be displayed on the display unit 105 or as an output signal id to be transferred to an external device. For example, an LCD panel, a CRT, or the like may be used as the display unit 105.

The storage unit 125 stores a computer program including a process procedure of the critical heat flux prediction method according to the first embodiment, measurement data of an experiment for estimating the critical heat flux correlation, a database of measurement data of an experiment, a sub-channel analysis code, and the like. Here, the storage unit 125 may be configured with a volatile memory such as a random access memory (RAM), a non-volatile memory such as a flash memory, a hard disk drive (HDD), or a combination thereof.

The computer program may be combined with a computer program previously recorded in the processing unit 120 to implement the process procedure of the critical heat flux prediction method according to this embodiment. Further, the critical heat flux prediction device 100 may implement the functions of the experimental data plotting unit 121, the sub-channel analyzing unit 122, and the critical heat flux correlation calculating unit 123 using dedicated hardware instead of the computer program.

Further, the critical heat flux prediction method according to this embodiment may be implemented by executing a previously prepared critical heat flux prediction program through a computer system such as a personal computer (PC), a workstation, or a plant control computer. Further, the program may be recorded in a recording device such as a hard disk or a computer readable recording medium such as a floppy disk (FD), a read only memory (ROM), a compact disc read only memory (CD-ROM), a magneto-optical disc (MO), a digital versatile disc (DVD), or a flash memory, read from the recording medium, and executed through a computer. Here, the "computer system" includes an operating system (OS) or hardware such as peripheral devices.

Further, the "computer readable recording medium" includes a medium that dynamically holds a program for a short time such as a communication line when a program is transmitted through a network such as the Internet or a communication line network such as a telephone line or a medium that holds a program for a predetermined period of time such as a volatile memory in a computer system such as a server or a client in that case. Further, the program may be configured to implement a part of the above-described function or to implement the above-described function by a combination of a program previously recorded in a computer system.

Next, a critical heat flux prediction method using the critical heat flux prediction device 100 according to the first embodiment will be described. First, a real core shape simulation fuel experiment device of acquiring experimental data by a simulation of a real reactor will be described.

Figure 7:
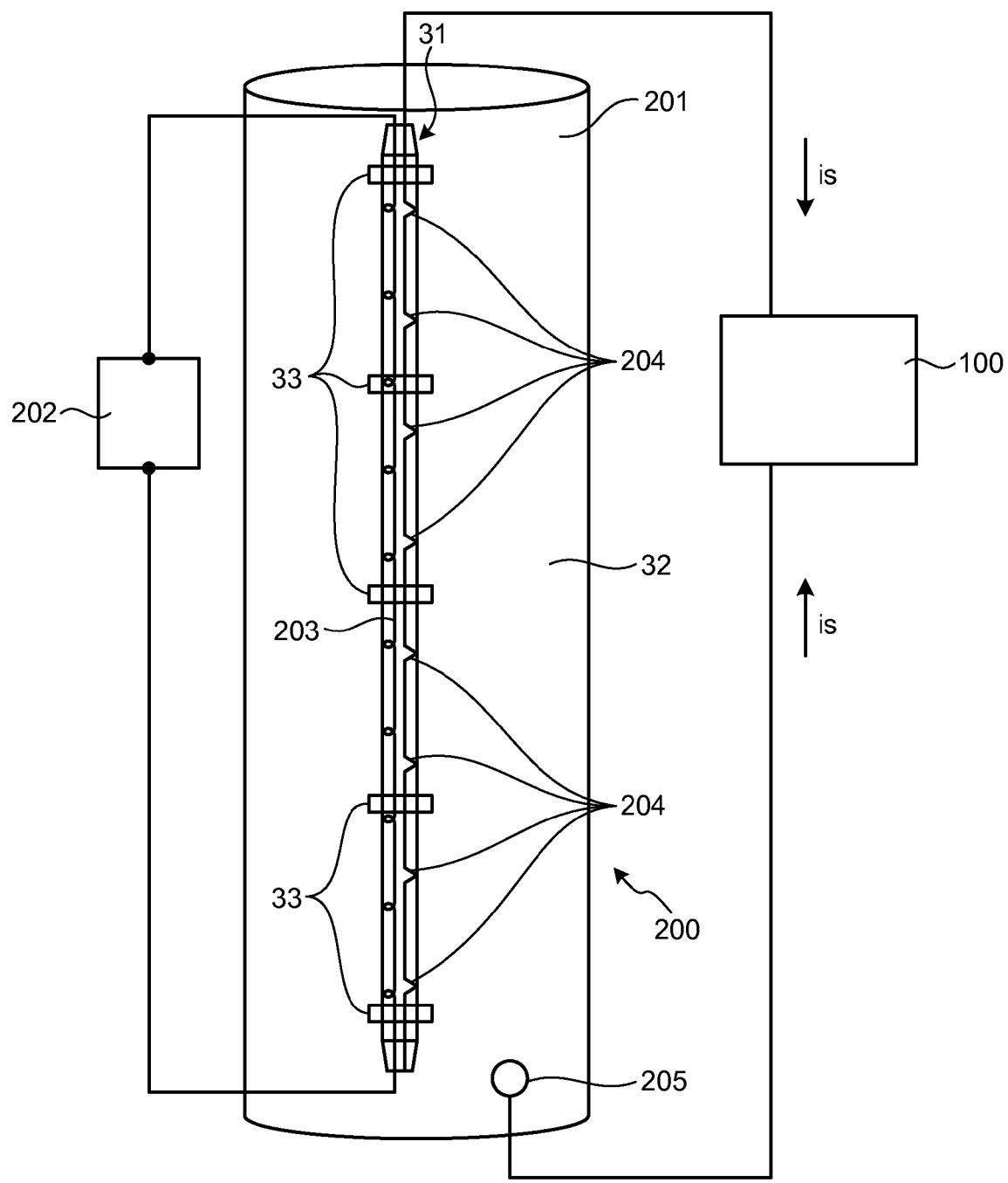
FIG. 7 is an explanatory diagram for schematically describing a real core shape simulation fuel experiment device according to the first embodiment.

FIG. 7 is an explanatory diagram for schematically describing a real core shape simulation fuel experiment device. An experiment device 200 includes an experimental vessel 201 which is filled with a coolant 32. In the experimental vessel 201 of the experiment device 200, a simulation fuel rod 31 including a simulation support grid 33 is arranged to be covered with the coolant 32. The simulation fuel rod 31 is configured to be directly heated such that a power supply 202 applies a voltage directly to the simulation fuel rod 31. Alternatively, the simulation fuel rod 31 may be configured to be indirectly heated through a heater 203 connected to the power supply 202. The simulation fuel rod 31 is used to simulate a main dimension (for example, a hydraulic equivalent diameter and a heated length) that is desired to design as a fuel assembly. The experiment device 200 includes a sensor 204 that measures the surface temperature of the simulation fuel rod 31. The sensor 204 is connected with the critical heat flux prediction device 100. A plurality of sensors 204 are disposed in the experiment device 200, and the critical heat flux can be sensed by any one of sensors 204. The sensor 204 may sense the critical heat flux when the temperature of the simulation fuel rod 31 has steeply increased. The experiment device 200 includes a sensor 205 that measures the pressure, the mass velocity, and the temperature of the coolant 32 inside the device. The sensor 205 also measures heat flux generated from the simulation fuel rod 31. The sensor 205 is connected with the critical heat flux prediction device 100. The experiment device 200 performs an experiment while changing an experimental condition of the pressure, the mass velocity, and the temperature of the coolant 32 inside the device, and heat flux generated from the simulation fuel rod 31. For each experimental condition, measurement data at the time of critical heat flux is sampled by the sensor 204 and the sensor 205, and is transferred to the critical heat flux prediction device 100 as the output signal is together with a thermal equilibrium quality obviously determined from the experimental condition. Here, the thermal equilibrium quality refers to an enthalpy function expressed by Formula (2) represented by the following "Math. 4." As the simulation fuel rod 31, a plurality of fuel rods may be simulated, or a fuel assembly of a 3×3 array or a 5×5 array may be simulated. For example, as the experimental condition, the pressure is 9.8 MPa to 17.2 MPa, the mass velocity is 1200 kg/m²s to 5000 kg/m²s, and the inlet temperature is 183° C. to 331° C. Further, for example, as an examination portion shape, a heating rod external form is 9.50 mm to 12.7 mm, a heated length is 2.44 m to 4.27 m, an axial direction output distribution is uniform or non-uniform, a hydraulic equivalent diameter is 9.4 mm to 15.2 mm, and a support grid interval is 330 mm to 813 mm.

$$x = \frac{h_g - h_{lsat}}{h_{fg}} \quad (2)$$

$h_g$: enthalpy of coolant J/kg $h_{lsat}$: enthalpy of saturated water J/kg $h_{fg}$: latent heat J/kg As illustrated in FIG. 6, the critical heat flux prediction device 100 converts the output signals is output from the sensors 204 and 205 of FIG. 7 into signals that can be used by the processing unit 120 through the noise filter, the A/D converter, or the like included in the input processing circuit 101. The processing unit 120 receives the output signal is through the input port 102, and stores the sampled output signal is in the storage unit 125 as experimental data. Further, when an experimental condition is not held in the storage unit 125 in advance, preferably, an experimental condition is input through the input unit 106 such as a keyboard and then held in the storage unit 125 through the input processing circuit 101 and the input port 102. Then, the critical heat flux prediction device 100 makes a database of experimental data such that experimental condition data is linked with measurement data of an experiment, and stores the database in the storage unit 125.

Figure 8:
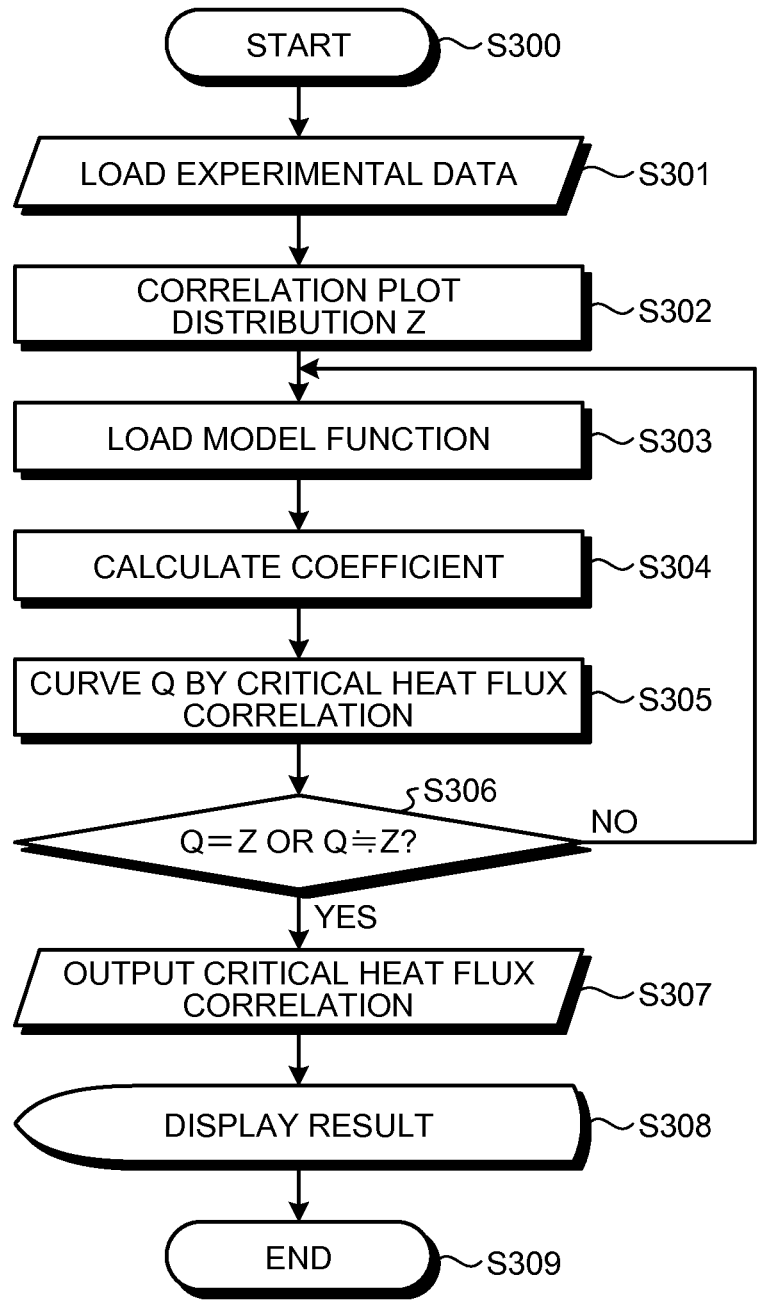
FIG. 8 is a flowchart for describing a critical heat flux prediction process according to the first embodiment.

A critical heat flux prediction process will be described with reference to FIGS. 6 to 13. FIG. 8 is a flowchart for describing the critical heat flux prediction process.

As illustrated in FIGS. 6 and 8, the critical heat flux prediction device 100 starts the critical heat flux prediction (step S300). First, the critical heat flux prediction device 100 starts a load step of reading sampled experimental data (experimental condition data and measurement data) from the storage unit 125 into a memory of the processing unit 120 (step S301). Here, the read experimental data is experimental data acquired for each of variously specified conditions on the pressure, the mass velocity, and the temperature of the coolant 32 in the real core shape simulation fuel experiment.

When all experimental data to analyze is loaded into the memory, the sub-channel analyzing unit 122 provides information such as an power, the pressure, the temperature, the mass velocity, and the core power distribution in the real core shape simulation fuel experiment device to an existing sub-channel analysis code, and obtains three-dimensional (3D) fluid behavior inside the real core shape simulation fuel experiment device. For example, a known analysis code may be used as the existing analysis code. The critical heat flux prediction device 100 uses the experimental data analyzed by the sub-channel analyzing unit 122 for a scatter diagram through the experimental data plotting unit 121. The scatter diagram is created such that experimental data is plotted (dotted) using critical heat flux as a vertical axis and a thermal equilibrium quality as a horizontal axis. The experimental data plotting unit 121 obtains a correlation plot distribution Z that is a plot distribution in the scatter diagram (step S302).

Next, the critical heat flux correlation calculating unit 123 illustrated in FIG. 6 obtains an approximate curve that approximates to the correlation plot distribution Z. Here, a model function is used for a calculation of the approximate curve. In the first embodiment, a model function is used as a function of critical heat flux on a thermal equilibrium quality, and a logistic function is used as a critical heat flux correlation. The logistic function can be expressed by Formula (1) represented by the following "Math. 5." Here, q" is the critical heat flux, x is the thermal equilibrium quality, and A, K, and C are coefficients.

$$q'' = \frac{A}{1 + \exp(-K((1-x) - C))} \quad (1)$$

As illustrated in FIG. 8, Formula (1) is read from the storage unit 125, and loaded into the memory of the processing unit 120 (step S303).

Here, for example, the critical heat flux correlation calculating unit 123 calculates the coefficients A, K, and C using a least square method such that the correlation plot distribution Z is approximated by the logistic function (Formula (1)) that is the model function (step S304). The critical heat flux correlation calculating unit 123 approximates the correlation plot distribution Z by Formula (1) that is the logistic function by obtaining the coefficients A, K, and C. As the coefficients A, K, and C are decided as described above, the correlation of the critical heat flux and the thermal equilibrium quality is obtained in a condition having the mass velocity and the pressure of the coolant 32. The correlation of the critical heat flux and the thermal equilibrium quality is obtained by the above-described technique in all conditions of the mass velocity and the pressure in the real core shape simulation fuel experiment. Thus, there exist combinations of the coefficients A, K, and C that are equal in number to the number of all conditions of the mass velocity and the pressure in the real core shape simulation fuel experiment.

When the critical heat flux is obtained using the correlation, it is desirable to use one in which the coefficients A, K, and C corresponding to the mass velocity and the pressure of the coolant of a desired condition are substituted into Formula (1). For example, in the range of the real core shape simulation fuel experiment, a data table in which a value of a coefficient on a combination of the mass velocity and the pressure of the coolant is described is created on each of the coefficients A, K, and C and then stored in the storage unit 125. Then, when the critical heat flux is obtained using the correlation, the coefficients A, K, and C corresponding to the mass velocity and the pressure of the coolant in the desired condition are read from the data table and then substituted into Formula (1), and the correlation of the critical heat flux and the thermal equilibrium quality in a desired condition is obtained.

Further, an approximate formula on the mass velocity and the pressure of the coolant on each of the coefficients A, K, and C may be obtained, and then the coefficients A, K, and C corresponding to the mass velocity and the pressure of the coolant in a desired condition may be obtained. In other words, an approximate formula in which the mass velocity and the pressure of the coolant are used as variables is obtained on the coefficients A, K, and C, and the necessary coefficients A, K, and C may be decided using the approximate formula. For example, using a relation between the coefficient A and the mass velocity and the pressure of the coolant in the range of the real core shape simulation fuel experiment, an approximate formula of the coefficient A in which the mass velocity and the pressure of the coolant are used as variables is obtained by a least square method or the like. Approximate formulas of the coefficients K and C are obtained in a similar manner. Then, the obtained approximate formulas of the coefficients A, K, and C are stored in the storage unit 125. When the critical heat flux is obtained using the correlation, the coefficients A, K, and C are obtained by substituting the mass velocity and the pressure of the coolant in a desired condition into the approximate formula. The obtained coefficients A, K, and C are substituted into Formula (1), and the correlation of the critical heat flux and the thermal equilibrium quality in the desired condition is obtained.

Figure 9:
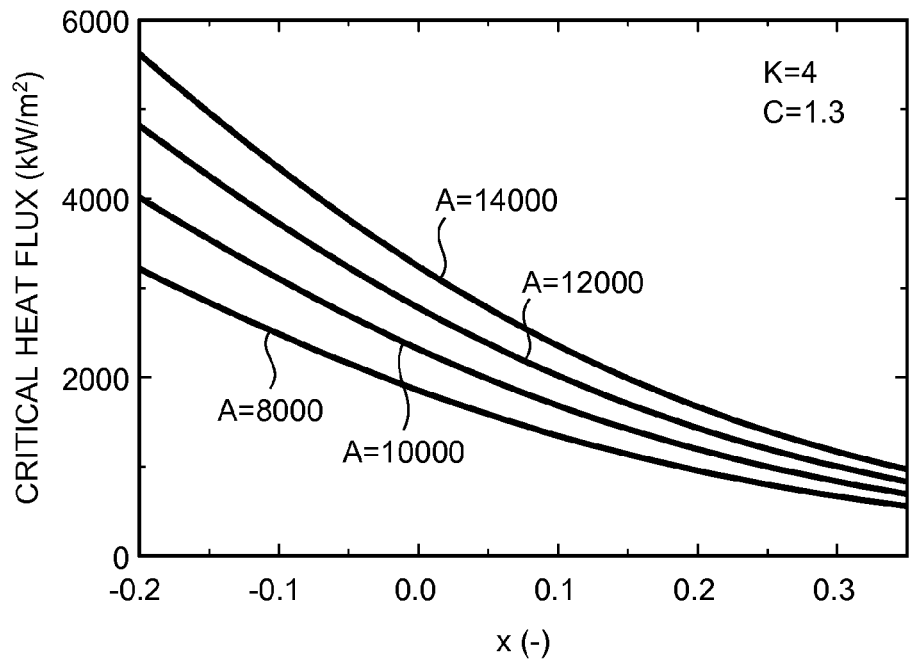
FIG. 9 is an explanatory diagram for describing behavior of a critical heat flux correlation according to the first embodiment.
Figure 10:
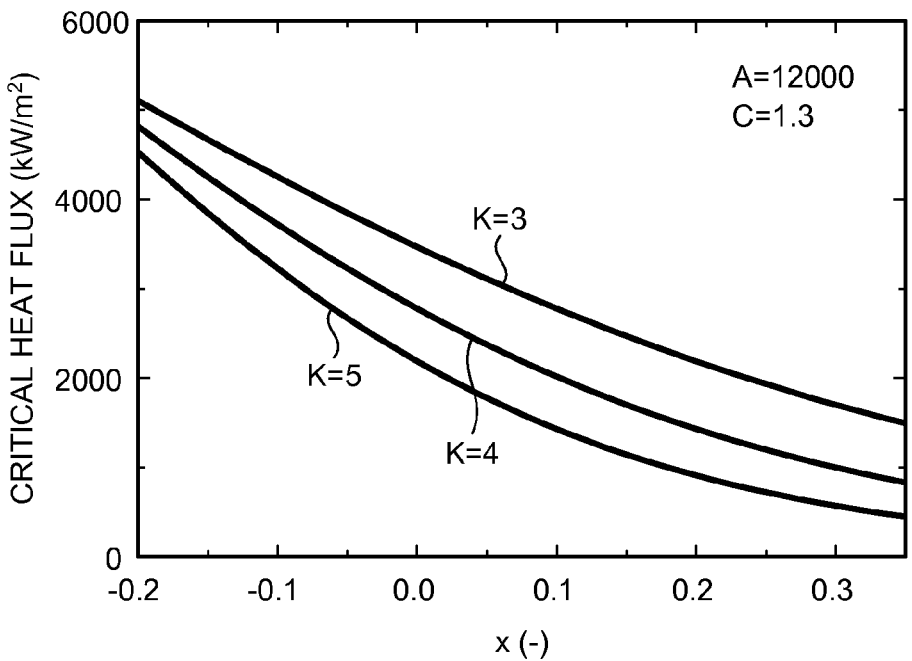
FIG. 10 is an explanatory diagram for describing behavior of the critical heat flux correlation according to the first embodiment.
Figure 11:
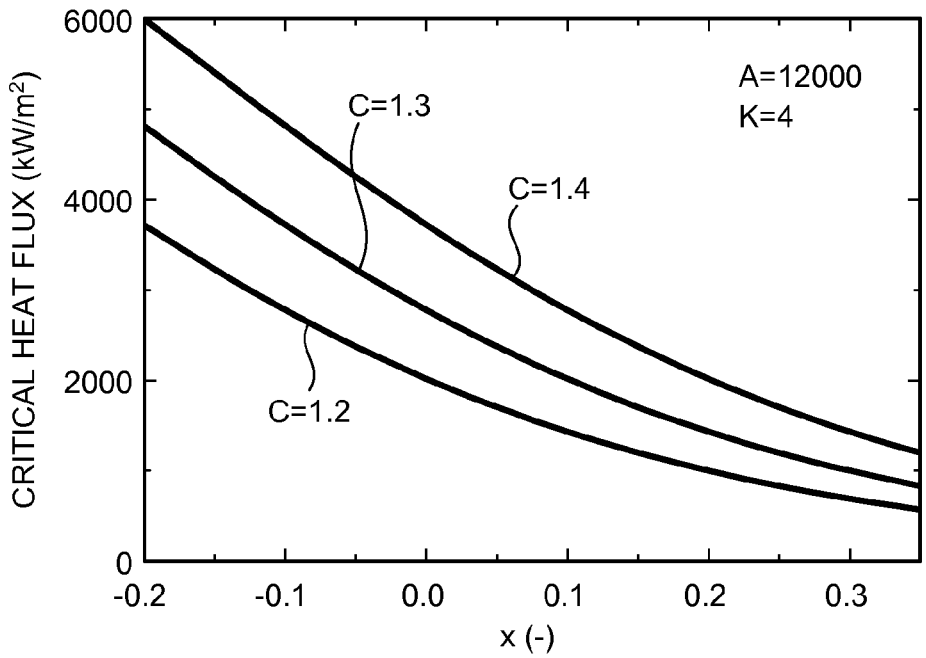
FIG. 11 is an explanatory diagram for describing behavior of the critical heat flux correlation according to the first embodiment.

FIGS. 9 to 11 are explanatory diagrams illustrating results of calculating the coefficients A, K, and C in advance. In FIG. 9, in the logistic function (Formula (1)) that is the model function, a vertical axis represents the critical heat flux, a horizontal axis represents the thermal equilibrium quality (x(−)), the coefficients K and C are fixed, and the coefficient A is changed. Specifically, the coefficients K and C are fixed to 4 and 1.3, respectively. As illustrated in FIG. 9, the coefficient A is changed to 8000, 10000, 12000, and 14000, the critical heat flux increases according to an increase in the coefficient A. Further, it can be understood that as the thermal equilibrium quality increases, the critical heat flux converges to a value of predetermined critical heat flux regardless of the coefficient A. Further, in FIG. 10, in the logistic function (Formula (1)) that is the model function, a vertical axis represents the critical heat flux, a horizontal axis represents the thermal equilibrium quality (x(−)), the coefficients A and C are fixed, and the coefficient K is changed. Specifically, the coefficients A and C are fixed to 12000 and 1.3, respectively. As illustrated in FIG. 10, the coefficient K is changed to 3, 4, and 5, the critical heat flux decreases according to an increase in the coefficient K. In FIG. 11, in the logistic function (Formula (1)) that is the model function, a vertical axis represents the critical heat flux, a horizontal axis represents the thermal equilibrium quality (x(−)), the coefficients A and K are fixed, and the coefficient C is changed. Specifically, the coefficient A and K are fixed to 12000 and 4, respectively. As illustrated in FIG. 11, the coefficient C is changed to 1.2, 1.3, and 1.4, and the critical heat flux increases according to an increase in the coefficient C. As described above, the critical heat flux correlation calculating unit 123 can calculate behavior of the model function of the coefficients A, K, and C and store a database of the coefficients A, K, and C in the storage unit 125. In order to approximate the correlation plot distribution Z through the model function, the critical heat flux correlation calculating unit 123 specifies a combination in which a result of substituting the coefficients A, K, and C into the model function is closest with reference to the database of the coefficients A, K, and C. Then, the coefficients A, K, and C specified by the critical heat flux correlation calculating unit 123 can be input to the logistic function (Formula (1)) that is the model function. Even the correlation plot distribution Z having the inflection point or the correlation plot distribution Z that is a convergence curve can be approximated by the model function. When the experimental condition and the coefficients A, K, and C are registered to the database and a correlation is shown between the experimental condition and the coefficients A, K, and C, for example, the coefficients A, K, and C are expressed by a function of a pressure and flux for each coefficient. Alternatively, for example, the coefficients A, K, and C may be expressed by a function of a pressure and flux for each coefficient such that an experimental condition, for example, a shape element such as a support grid interval is included. Then, the critical heat flux correlation calculating unit 123 can input the coefficients A, K, and C expressed by the function of the experimental condition to the logistic function (Formula (1)) that is the model function.

As illustrated in FIG. 8, the model function to which the critical heat flux correlation calculating unit 123 has input the coefficients A, K, and C (step S304) becomes the critical heat flux correlation. Next, as illustrated in FIG. 8, the critical heat flux correlation calculating unit 123 of FIG. 6 calculates the heat flux by substituting a predetermined range of thermal equilibrium quality into the critical heat flux correlation, and causes a curve Q by the critical heat flux correlation to be stored in the memory of the processing unit 120 of FIG. 6 (step S305). Next, the curve Q by the critical heat flux correlation is compared with the correlation plot distribution Z (step S306). When the value obtained by the curve Q by the critical heat flux correlation matches the correlation plot distribution Z (Q=Z) or when the value obtained by the curve Q and the correlation plot distribution Z does not match each other but are apart from each other within a predetermined allowable error (Q≈Z), the critical heat flux correlation calculating unit 123 outputs the critical heat flux correlation to which the coefficients A, K, and C are input to the output port 103 (step S307). The allowable error is preferably stored in the storage unit 125 in advance, and loaded into the memory of the processing unit 120 as a reference at the time of comparison. However, when the curve Q by the critical heat flux correlation does not match the correlation plot distribution Z or when the curve Q by the critical heat flux correlation and the correlation plot distribution Z do not match each other but are apart from each other by the allowable error or more, the process starts from step (step S303) of calculating the coefficients A, K, and C again.

Figure 12:
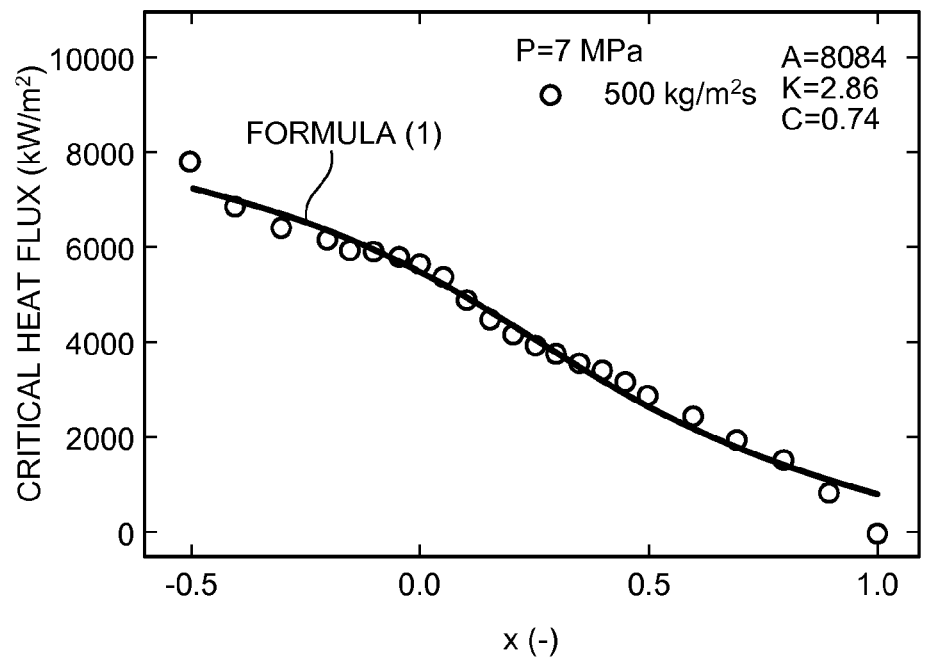
FIG. 12 is an explanatory diagram for describing fitting of the critical heat flux correlation according to the first embodiment.
Figure 13:
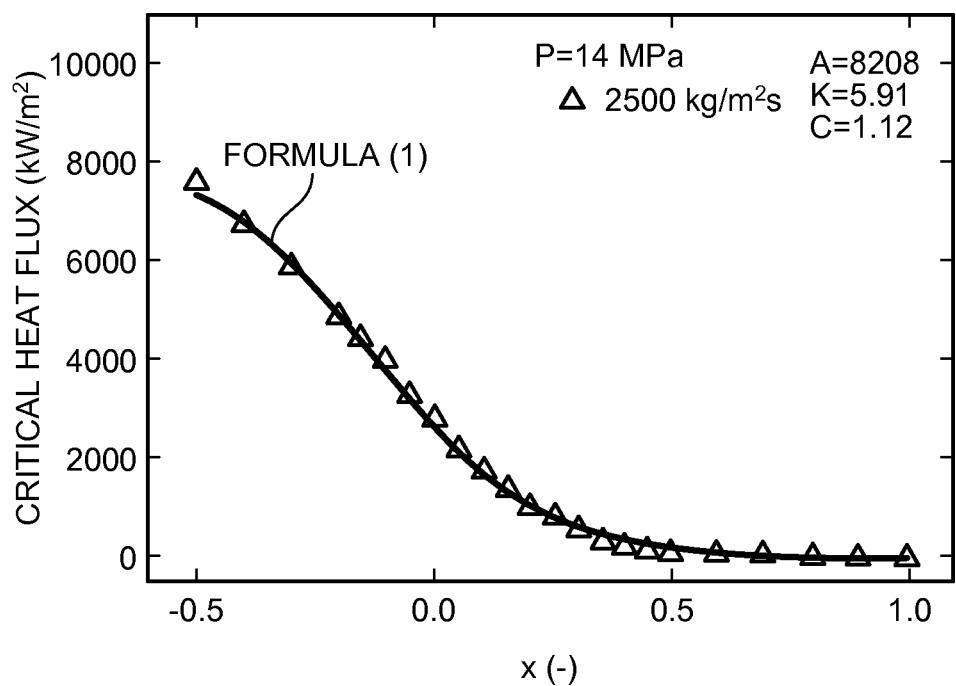
FIG. 13 is an explanatory diagram for describing fitting of the critical heat flux correlation according to the first embodiment.

For example, in FIGS. 12 and 13, experimental data is illustrated as the correlation plot distribution Z using the critical heat flux as a vertical axis and the thermal equilibrium quality (x(−)) as a horizontal axis. As an experimental condition illustrated in FIG. 12, the pressure is 7 MPa, and the mass velocity is 500 kg/m$^2$s. In FIG. 8, the coefficients A, K, and C of step S304 are 8084, 2.86, and 0.74, respectively. It can be understood that when the curve Q by the critical heat flux correlation overlaps the correlation plot distribution Z of FIG. 12, the curve Q by the critical heat flux correlation is fitted as an approximate curve almost matching the correlation plot distribution Z. As another experimental condition, experimental condition illustrated in FIG. 13 is that the pressure is 14 MPa, and the mass velocity is 2500 kg/m$^2$s. In FIG. 8, the coefficients A, K, and C of step S304 are 8208, 5.91, and 1.12, respectively. It can be understood that when the curve Q by the critical heat flux correlation overlaps the correlation plot distribution Z of FIG. 13, the curve Q by the critical heat flux correlation is fitted as an approximate curve almost matching the correlation plot distribution Z. As can be seen from FIGS. 12 and 13, the correlation plot distribution Z changes according to each condition of at least the pressure and the mass velocity. The curve Q by the critical heat flux correlation may approximate to the correlation plot distribution Z even when each condition of the pressure and the mass velocity changes. The critical heat flux prediction device 100 according to the first embodiment may use a non-linear critical heat flux correlation. In other words, the critical heat flux prediction device 100 according to the first embodiment can predict the critical heat flux with a high degree of accuracy even when the thermal equilibrium quality is extensive. For example, the critical heat flux prediction device using a prediction formula of the linear function according to the related art can predict the critical heat flux on the thermal equilibrium quality having a range of up to −0.19 to +0.32. According to the first embodiment, the critical heat flux prediction device 100 can predict the critical heat flux on the thermal equilibrium quality having a range of −0.50 to +1.00 with a high degree of accuracy.

The data of the output critical heat flux correlation (step S307) is output to the safety evaluation system as the output signal id together with the experimental condition. The processing unit 120 of the critical heat flux prediction device 100 can predict the critical heat flux in case of a predetermined thermal equilibrium quality with a high degree of accuracy using the output critical heat flux correlation. For example, the processing unit 120 of the critical heat flux prediction device 100 can predict the critical heat flux on the thermal equilibrium quality between pieces of data having experimental data. In addition, more preferably, the critical heat flux correlation is also displayed on the display unit 105 so that transmission data can be checked (step S308). Thereafter, the critical heat flux prediction device 100 ends the process (step S309).

Figure 14:
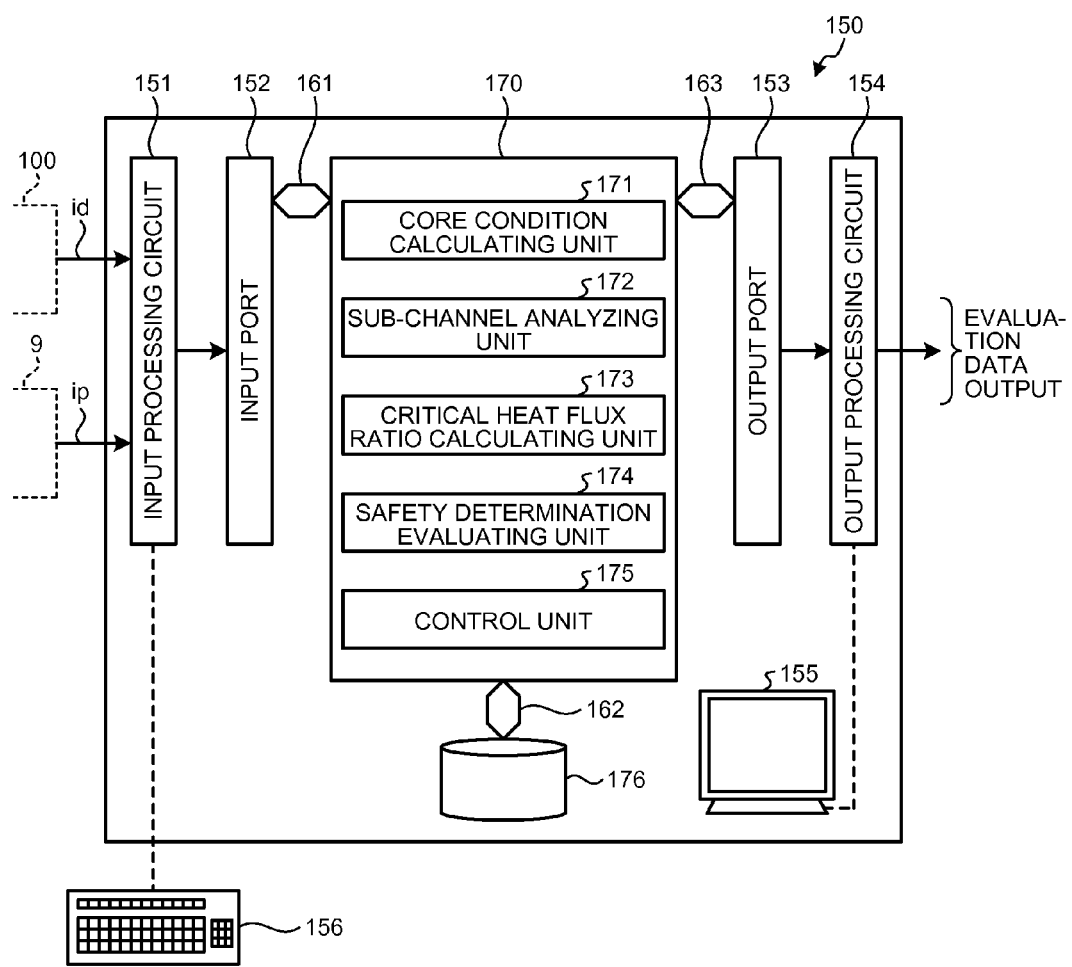
FIG. 14 is an explanatory diagram for describing a safety evaluation system according to the first embodiment.

FIG. 14 is an explanatory diagram for describing a safety evaluation system that performs a safety evaluation using the critical heat flux correlation. As illustrated in FIG. 14, a safety evaluation system 150 includes an input processing circuit 151, an input port 152, a processing unit 170, a storage unit 176, an output port 153, an output processing circuit 154, a display unit 155, and an input unit 156 such as a keyboard which is disposed as necessary. For example, the processing unit 170 may be configured such that a CPU is combined with a memory. The processing unit 170 includes a core condition calculating unit 171, a sub-channel analyzing unit 172, a critical heat flux ratio calculating unit 173, a safety determination evaluating unit 174, and a control unit 175. Of these, the core condition calculating unit 171, the sub-channel analyzing unit 172, the critical heat flux ratio calculating unit 173, and the safety determination evaluating unit 174 are portions that execute a safety evaluation according to the first embodiment.

The processing unit 170, the storage unit 176, the input port 152, and the output port 153 are connected with one another through buses 161 to 163. The core condition calculating unit 171, the sub-channel analyzing unit 172, the critical heat flux ratio calculating unit 173, and the safety determination evaluating unit 174 that configure the processing unit 170 of the safety evaluation system 150 are configured to exchange control data with each other or transmit or receive a command to or from each other through the buses 161 to 163 and the control unit 175.

The input port 152 is connected to the input processing circuit 151. A measuring device 9 illustrated in FIG. 1 is connected to the input processing circuit 151. In addition, the input processing circuit 151 is connected with the critical heat flux prediction device 100 through a local area network (LAN) line. In the present embodiment, the critical heat flux prediction device 100 is connected with the safety evaluation system 150 through a LAN line. For example, since it is preferable that data of the output signal id of the critical heat flux prediction device 100 be input to the safety evaluation system 150, data of the output signal id of the critical heat flux prediction device 100 may be input to the safety evaluation system 150 through the computer readable recording medium in an offline mode and stored in the storage unit 176. An output signal ip output from the measuring device 9 is converted into a signal that can be used by the processing unit 170 through a noise filter, an A/D converter, or the like included in the input processing circuit 151, and then transmitted to the processing unit 170 through the input port 152. As a result, the processing unit 170 can acquire information necessary to obtain the critical heat flux ratio.

The output port 153 is connected to the output processing circuit 154. The display unit 155 and an external output terminal are connected to the output processing circuit 154. The output processing circuit 154 includes a display unit control circuit, a signal amplifying circuit, and the like, and causes the safety evaluation calculated by the processing unit 170 to be displayed on the display unit 155 or outputs the safety evaluation to an external device. For example, an LCD panel, a CRT, or the like may be used as the display unit 155.

The storage unit 176 stores a computer program including a process procedure of the safety evaluation according to this embodiment, a computer program for estimating the critical heat flux ratio, a sub-channel analysis code, and the like. Here, the storage unit 176 may be configured with a volatile memory such as a RAM, a non-volatile memory such as a flash memory, a HDD, or a combination thereof.

The computer program may be combined with a computer program previously recorded in the processing unit 170 to implement the process procedure of the safety evaluation according to this embodiment. Further, the safety evaluation system 150 may implement the functions of the core condition calculating unit 171, the sub-channel analyzing unit 172, the critical heat flux ratio calculating unit 173, and the safety determination evaluating unit 174 using dedicated hardware instead of the computer program.

Further, the safety evaluation according to this embodiment may be implemented by executing a previously prepared safety evaluation program through a computer system such as a PC, a workstation, or a plant control computer. Further, the program may be recorded in a recording device such as a hard disk or a computer readable recording medium such as a FD, a ROM, a CD-ROM, a MO, a DVD, or a flash memory, read from the recording medium, and then executed through a computer. Here, the "computer system" includes an OS and hardware such as peripheral devices.

Further, the "computer readable recording medium" includes a medium that dynamically holds a program for a short time such as a communication line when a program is transmitted through a network such as the Internet or a communication line network such as a telephone line or a medium that holds a program for a predetermined period of time such as a volatile memory in a computer system such as a server or a client in that case. Further, the program may be configured to implement a part of the above-described function or to implement the above-described function by a combination of a program previously recorded in a computer system.

Figure 15:
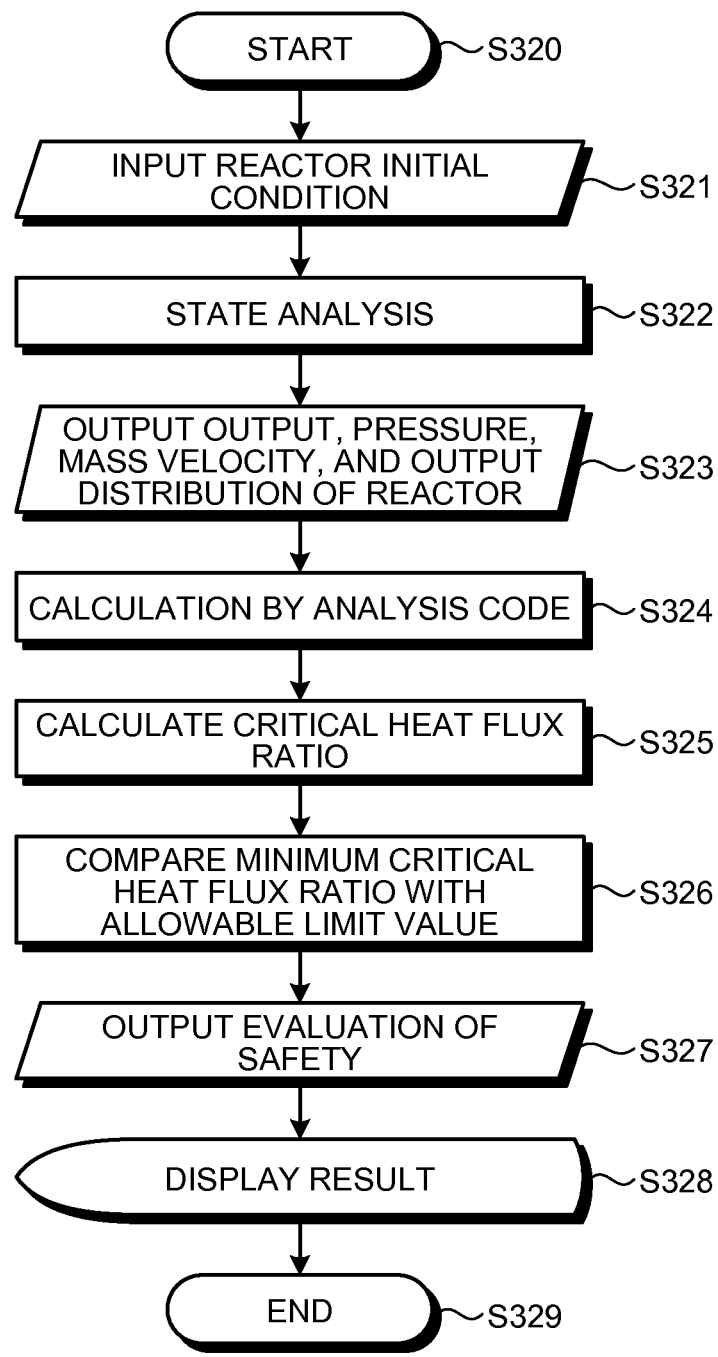
FIG. 15 is a flowchart for describing the safety evaluation process according to the first embodiment.

A safety evaluation process will be described with reference to FIGS. 14 and 15. FIG. 15 is a flowchart for describing the safety evaluation process. As illustrated in FIG. 15, the safety evaluation system 150 starts the core safety evaluation (step S320). The safety evaluation system 150 starts a load step of reading an initial condition of the reactor that is input by the input unit 156 such as a keyboard in advance and stored in the storage unit 176 (step S321). For example, the initial condition of the reactor includes a main dimension of the fuel assembly, a shape condition of the fuel assembly, and the shape of a core configured with a plurality of fuel assemblies.

Next, the core condition calculating unit 171 of the processing unit 170 performs reactor state analysis by an existing analysis code based on measurement data obtained by analyzing the initial condition of the reactor and the output signal ip output from the measuring device 9 (step S322). For example, a known analysis code may be used as the existing analysis code. The sub-channel analyzing unit 172 acquires information such as the power, the pressure, the temperature, the mass velocity, and the core power distribution of the reactor by the state analysis of the core condition calculating unit 171 (step S323). The sub-channel analyzing unit 172 provides the information such as the power, the pressure, the temperature, the mass velocity, and the core power distribution of the reactor by the state analysis of the core condition calculating unit 171 to the existing sub-channel analysis code, and obtains 3D fluid behavior inside the core (step S324). For example, a known analysis code may be used as the existing sub-channel analysis code.

Next, the critical heat flux ratio calculating unit 173 reads the critical heat flux correlation obtained by the critical heat flux prediction device 100 from the storage unit 176 to the memory of the processing unit 170. The critical heat flux correlation is a logistic function. As described above, the logistic function is expressed by Formula (1) that is a function of critical heat flux on a thermal equilibrium quality. Here, q" is critical heat flux, x is a thermal equilibrium quality, and A, K, and C are coefficients. The critical heat flux ratio refers to a ratio between critical heat flux and an actual heat flux. The critical heat flux ratio of the fuel rod that is thermally harshest inside the core is referred to as a minimum critical heat flux ratio. The critical heat flux ratio calculating unit 173 calculates the critical heat flux ratio of the fuel rod that is thermally harshest in the core analyzed by the sub-channel analyzing unit 172 using the critical heat flux correlation obtained by the critical heat flux prediction device 100, and uses the calculated critical heat flux ratio as an evaluation value of the minimum critical heat flux ratio (step S325). Then, the safety determination evaluating unit 174 reads an allowable limit value of the minimum critical heat flux ratio at a 95% probability at a 95% confidence level, for example, 1.17 from the storage unit 176, and compares the allowable limit value with the evaluation value of the minimum critical heat flux ratio calculated in step S325 (step S326). When the evaluation value of the minimum critical heat flux ratio is larger than the allowable limit value of the minimum critical heat flux ratio, it is determined to be safe, and evaluation data is output (S327). For example, the evaluation data is registered to and accumulated in a design database. Further, more preferably, the evaluation data is displayed on the display unit 155 so that the evaluation data can be checked (step S328). Thereafter, the safety evaluation system 150 ends the process (step S329).

The evaluation data output by the safety evaluation system 150 and the safety evaluation process are used as data to evaluate the thermal margin of the fuel rod of the reactor. When the thermal margin of the fuel rod of the reactor is designed to be high, reliability of the core of the reactor increases. Further, the evaluation data is used to determine fuel integrity of the reactor at the time of a normal operation and at the time of anticipated operational occurrence. Further, the evaluation data can be used for accident analysis.

Figure 16:
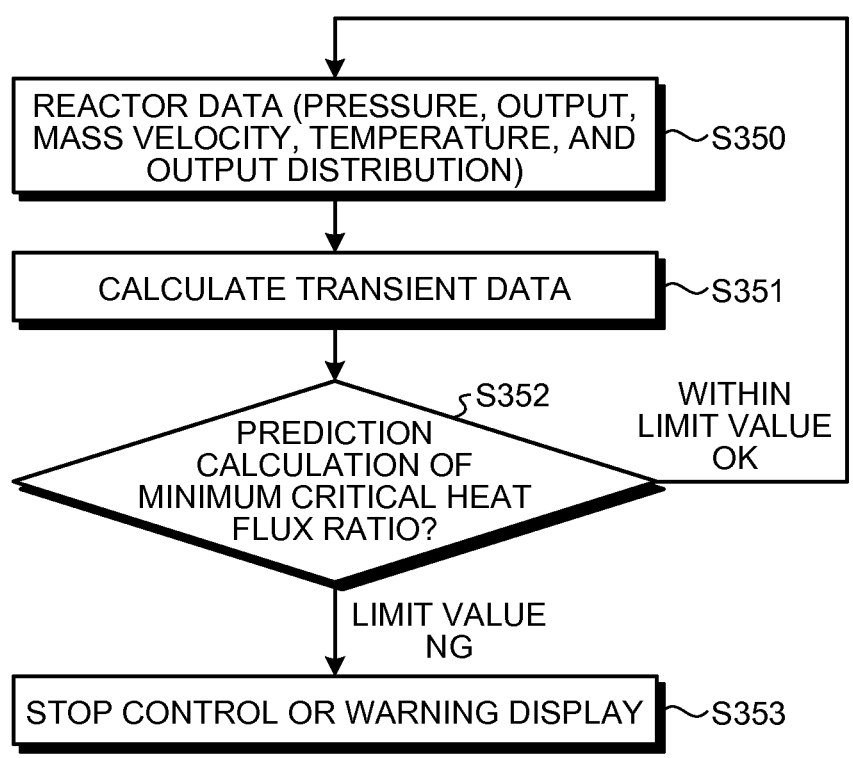
FIG. 16 is a flowchart for describing a core monitoring process according to the first embodiment.

Next, a core monitoring system according to the first embodiment will be described with reference to FIGS. 1, 14, 15, and 16. The core monitoring system is a system in which the safety evaluation system 150 illustrated in FIG. 14 is incorporated into the plant control device 10 illustrated in FIG. 1. FIG. 16 is a flowchart for describing a core fuel evaluation monitoring process.

As illustrated in FIG. 1, the measurement data from a sensor 15 in the core 3 is continuously received in an appropriate manner, accumulated and managed in the measuring device 9. As illustrated in FIG. 16, for example, the measuring device 9 receives the measurement data such as the pressure, the power, the temperature, and the mass velocity and stores the measurement data (step S350). Next, the measuring device 9 calculates a temporal change in the measurement data such as the pressure, the power, the mass velocity, and the temperature, and outputs the calculated temporal change as transient data (step S351). Next, the safety evaluation system 150 in the plant control device 10 receives each measurement data and each transient data of the reactor from the measuring device 9 through the input processing circuit 151. The safety evaluation system 150 calculates the minimum critical heat flux ratio according to the safety evaluation process illustrated in FIG. 15. The safety evaluation system 150 of FIG. 14 calculates a prediction value of the minimum critical heat flux ratio based on the transient data of the reactor. Further, the safety determination evaluating unit 174 predicts a time to be taken until the minimum critical heat flux ratio falls below the allowable limit value in the future (step S352). When the safety determination evaluating unit 174 determines that the value of the minimum critical heat flux ratio is larger than the allowable limit value, the core monitoring system returns to a step (step S350) of measuring the reactor data. When the safety determination evaluating unit 174 determines that the minimum critical heat flux ratio is the allowable limit value or less or determines that a time to be taken until the minimum critical heat flux ratio falls below the allowable limit value in the future is within a predetermined time, the plant control device 10 drives the control rod control device 6, and the control rod 4 coupled to the coupling rod 5 is inserted into the core 3 (core trip). The core monitoring system performs a warning display through the display unit 11 illustrated in FIG. 1 (step S353).

At the time of the normal operation of the reactor, the core monitoring system causes the value of the minimum critical heat flux ratio to be displayed on the display unit 11 of FIG. 1 in real time, and monitors whether or not the value of the minimum critical heat flux ratio is larger than the allowable limit value. Next, an anticipated operational occurrence of the reactor, for example, a failure of a cooling pump of circulating a coolant is considered. The value of the minimum critical heat flux ratio calculated by the critical heat flux ratio calculating unit 173 is larger than the allowable limit value at the initial stage. When the cooling pump degrades to gradually reduce flow rate of the coolant 32 of the core 3 and the safety determination evaluating unit 174 determines that a time to be taken until the minimum critical heat flux ratio falls below the evaluation value of the minimum critical heat flux ratio in the future is within a predetermined time, a warning is displayed on the display unit 11 together with a cause considered to cause abnormality. The core monitoring system according to the first embodiment can predict the critical heat flux with a high degree of accuracy even when the thermal equilibrium quality is extensive. In other words, since the prediction accuracy of the minimum critical heat flux using Formula (1) is high, the value of the minimum critical heat flux ratio in the anticipated operational occurrence of the reactor can be predicted with a high degree of accuracy. Thus, the core monitoring system according to the present invention can safely control the reactor at the time of the normal operation of the reactor and at the time of the anticipated operational occurrences.

Second Embodiment

Next, when the reactor 1 is the boiling water reactor (BWR), vapor is present in the center of a flow passage of a coolant between cladding tubes, and a liquid film flows around the wall surface of the cladding tube. The critical heat flux according to the second embodiment is referred to as a dryout since there is a case in which the liquid film may disappear. Further, in the boiling water reactor, the safety evaluation target of the reactor is not local heat flux but the whole fuel assembly. In this regard, it is necessary to obtain a critical power at which boiling transition occurs at the position of the fuel assembly that is thermally most disadvantageous.

A critical heat flux prediction process according to a second embodiment will be described with reference to FIGS. 6 to 8. In the present second embodiment, an experiment is performed in a state in which the simulation fuel rod 31 illustrated in FIG. 7 is replaced with a simulation fuel assembly. For example, the simulation fuel assembly is a 9×9 fuel. The critical heat flux prediction device 100 illustrated in FIG. 6 starts a critical heat flux prediction as illustrated in FIG. 8 (step S300). First, the critical heat flux prediction device 100 starts a load step of reading sampled experimental data (experimental condition data and measurement data) from the storage unit 125 into a memory of the processing unit 120 (step S301). The critical heat flux prediction device 100 completes the loading of all experimental data to be analyzed into the memory. Unlike the first embodiment, all measurement data are output. In this regard, the whole output that is the measurement data is divided by a cross-sectional area of the fuel assembly stored as initial data, and the division value is used as the critical heat flux. The experimental data plotting unit 121 uses the experimental data for the scatter diagram. The scatter diagram is created such that experimental data is plotted (dotted) using critical heat flux as a vertical axis and a thermal equilibrium quality as a horizontal axis. The experimental data plotting unit 121 obtains a correlation plot distribution Z that is a plot distribution in the scatter diagram (step S302).

Next, the critical heat flux correlation calculating unit 123 illustrated in FIG. 6 obtains an approximate curve that approximates to the correlation plot distribution Z. Here, a model function is used for a calculation of the approximate curve. In the second embodiment, a function of thermal equilibrium quality is used as a model function, and a critical heat flux correlation is used as a logistic function. The following logistic function can be expressed by Formula (1) described in the first embodiment. Here, q" is the critical heat flux, and x is the thermal equilibrium quality. As illustrated in FIG. 8, Formula (1) is read from the storage unit 125, and loaded into the memory of the processing unit 120 (step S303). Since Formula (1) that is the logistic function includes the coefficients A, K, and C, it is necessary to calculate and decide the coefficients (step S304). The coefficients are decided in the same manner as in the first embodiment. As illustrated in FIG. 8, the critical heat flux correlation calculating unit 123 uses the model function to which the coefficients A, K, and C (step S304) are input as the critical heat flux correlation. Next, as illustrated in FIG. 8, the critical heat flux correlation calculating unit 123 of FIG. 6 calculates the heat flux by substituting a predetermined range of thermal equilibrium quality into the critical heat flux correlation, and the curve Q by the critical heat flux correlation is held in the memory of the processing unit 120 of FIG. 6 (step S305). Next, the curve Q by the critical heat flux correlation is compared with the correlation plot distribution Z (step S306). When the value obtained by the curve Q by the critical heat flux correlation matches the correlation plot distribution Z (Q=Z) or when the value obtained by the curve Q by the critical heat flux correlation and the correlation plot distribution Z does not match each other but are apart from each other within a predetermined allowable error (Q≅Z), the critical heat flux correlation calculating unit 123 outputs the critical heat flux correlation to which the coefficients A, K, and C are input to the output port 103 (step S307). The allowable error is preferably stored in the storage unit 125 in advance, and loaded into the memory of the processing unit 120 as a reference at the time of comparison. However, when the curve Q by the critical heat flux correlation does not match the correlation plot distribution Z or when the curve Q by the critical heat flux correlation and the correlation plot distribution Z do not match each other but are apart from each other by the allowable error or more, the process restarts from step (step S303) of calculating the coefficients A, K, and C. The data of the output critical heat flux correlation (step S307) is output to the safety evaluation system as the output signal id together with the experimental condition. In addition, more preferably, the critical heat flux correlation is displayed even on the display unit 105 so that transmission data can be checked (step S308). Thereafter, the critical heat flux prediction device 100 ends the process (step S309).

Figure 17:
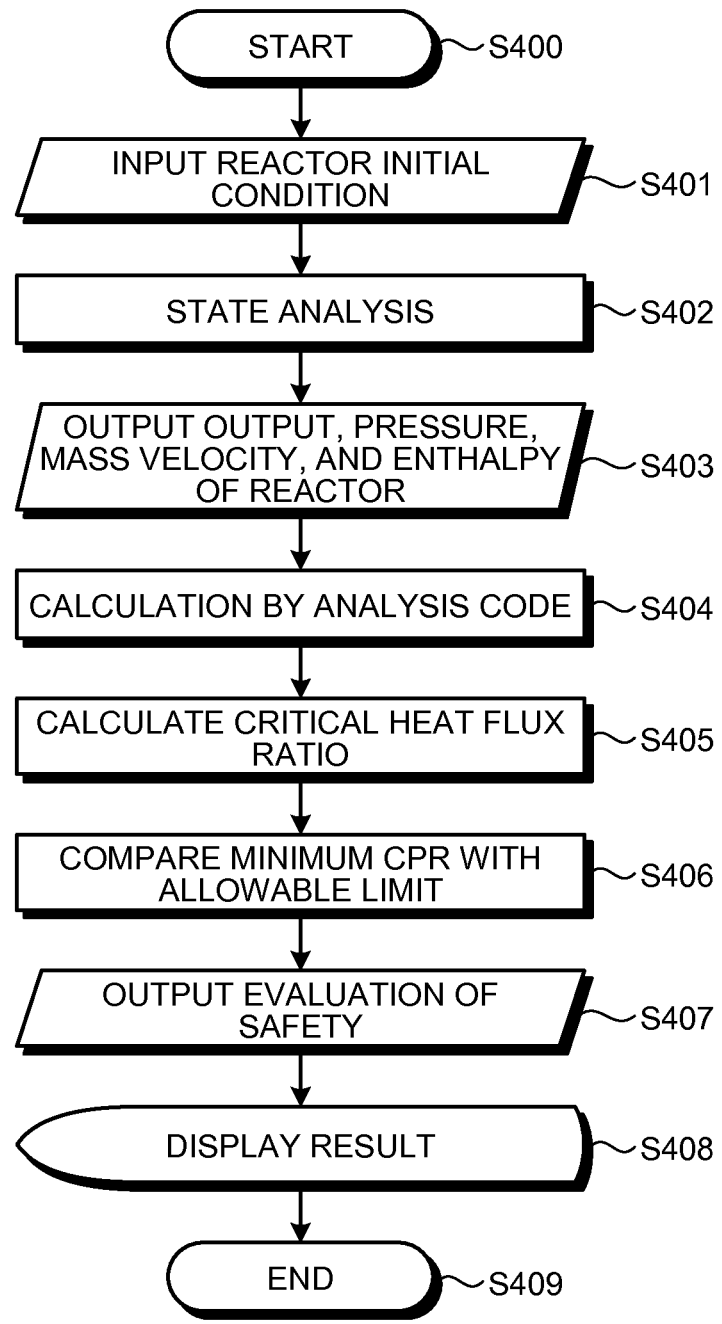
FIG. 17 is a flowchart for describing a safety evaluation process according to a second embodiment.
Figure 18:
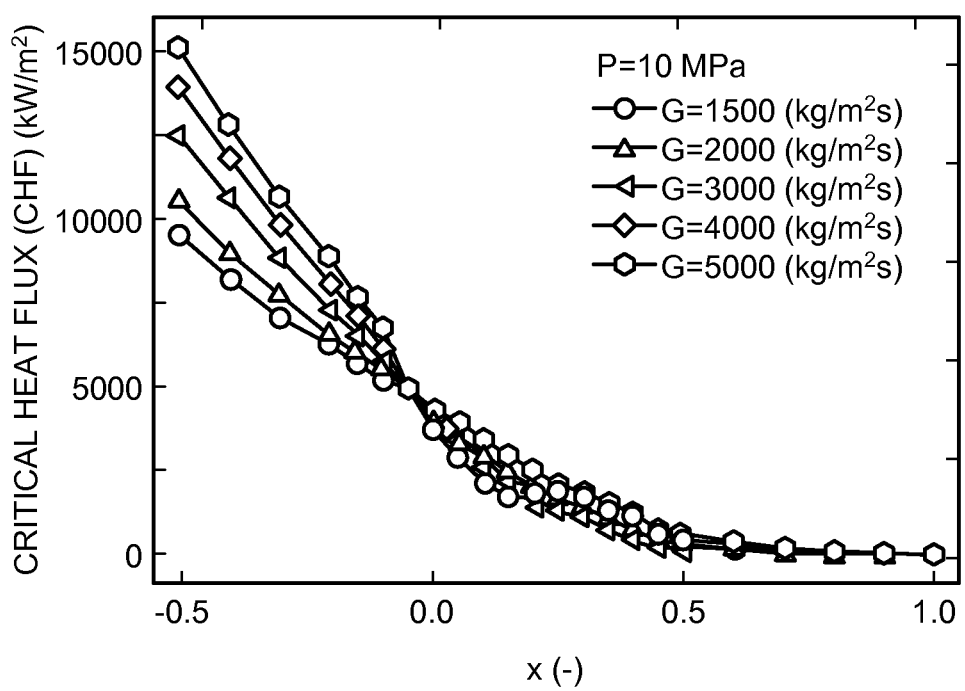
FIG. 18 is an explanatory diagram for describing a relation of an experimental characteristic (a look-up table of Groeneveld) of critical heat flux on a thermal equilibrium quality.

The safety evaluation process according to the second embodiment will be described with reference to FIGS. 1, 14, and 17. FIG. 17 is a flowchart for describing the safety evaluation process according to the second embodiment. As illustrated in FIG. 17, the safety evaluation system 150 starts the core safety evaluation (step S400). The safety evaluation system 150 starts a load step of reading an initial condition of the reactor that is input by the input unit 156 such as a keyboard in advance and stored in the storage unit 176 (step S401). For example, the initial condition of the reactor includes a main dimension of the fuel assembly and a shape condition of the fuel assembly.

Next, the core condition calculating unit 171 of the processing unit 170 performs reactor state analysis by an existing analysis code based on measurement data obtained by analyzing the initial condition of the reactor and the output signal ip output from the measuring device 9 (step S402). For example, a known analysis code may be used as the existing analysis code. The sub-channel analyzing unit 172 acquires information such as the power, the pressure, the temperature, the mass velocity, and the enthalpy of the reactor by the state analysis of the core condition calculating unit 171 (step S403). The sub-channel analyzing unit 172 provides the information such as the power, the pressure, the temperature, the mass velocity, and the enthalpy of the reactor by the state analysis of the core condition calculating unit 171 to the sub-channel code, and obtains 3D fluid behavior inside the core (step S404). For example, a known analysis code may be used as the sub-channel analysis code used by the sub-channel analyzing unit 172.

Next, the critical heat flux ratio calculating unit 173 reads the critical heat flux correlation obtained by the critical heat flux prediction device 100 from the storage unit 176 to the memory of the processing unit 170. Here, the critical heat flux correlation is a logistic function. As described above, the logistic function is expressed by Formula (1) that is a function of critical heat flux on a thermal equilibrium quality. Here, q" is critical heat flux, and x is a thermal equilibrium quality. The critical heat flux ratio refers to a ratio between critical heat flux and an actual heat flux. In the second embodiment, since the boiling water reactor (BWR) is used, a critical power ratio (CPR) is obtained from the ratio between the critical power and the power of the fuel assembly. The critical heat flux ratio calculating unit 173 obtains a critical power of the fuel assembly at which the critical heat flux ratio of the fuel rod that is thermally harshest in the core analyzed by the sub-channel analyzing unit 172 becomes one (1) based on the critical heat flux correlation. Then, the ratio between the critical power and the actual power of the fuel assembly is calculated (step S405). The critical power ratio of the fuel assembly including the fuel rod that is thermally harshest in the core is referred to as a minimum CPR. A limit value of the minimum CPR previously decided as the minimum CPR at the time of normal operation that 99.9% of all fuel in the core needs to keep at the time of anticipated operational occurrences in order not to cause the critical heat flux is read from the storage unit 176, and compared with the calculated minimum CPR (step S406). When the calculated minimum CPR is larger than the limit value of the minimum CPR, it is evaluated to be safe, and evaluation data is output (step S407). For example, the evaluation data is registered to and accumulated in a design database. Further, more preferably, the evaluation data is also displayed on the display unit 155 so that the evaluation data can be checked (step S408). Thereafter, the safety evaluation system 150 ends the process (step S409). Similarly to the first embodiment, the safety evaluation system and the safety evaluation process described in the second embodiment may be incorporated as the core monitoring system.

REFERENCE SIGNS LIST

1 REACTOR
2 PRESSURE VESSEL
3 CORE
4 CONTROL ROD
6 CONTROL ROD CONTROL DEVICE
9 MEASURING DEVICE
10 PLANT CONTROL DEVICE
11, 105, 155 DISPLAY UNIT
12, 106, 156 INPUT UNIT
15 SENSOR
30 FUEL ASSEMBLY
31 FUEL ROD
32 COOLANT
33 SUPPORT GRID
34 UPPER NOZZLE
35 LOWER NOZZLE
61 FUEL PELLET
62 CLADDING TUBE
63 SPRING
100 CRITICAL HEAT FLUX PREDICTION DEVICE
101, 151 INPUT PROCESSING CIRCUIT
102, 152 INPUT PORT
103, 153 OUTPUT PORT
104, 154 OUTPUT PROCESSING CIRCUIT
111 to 113, 161 to 163 BUS
120, 170 PROCESSING UNIT
121 EXPERIMENTAL DATA PLOTTING UNIT
122 SUB-CHANNEL ANALYZING UNIT
123 CRITICAL HEAT FLUX CORRELATION CALCULATING UNIT
124, 175 CONTROL UNIT
125, 176 STORAGE UNIT
150 SAFETY EVALUATION SYSTEM
171 CORE CONDITION CALCULATING UNIT
172 SUB-CHANNEL ANALYZING UNIT
173 CRITICAL HEAT FLUX RATIO CALCULATING UNIT
174 SAFETY DETERMINATION EVALUATING UNIT
200 EXPERIMENT DEVICE
201 EXPERIMENTAL VESSEL
202 POWER SUPPLY
203 HEATER
204, 205 SENSOR

The invention claimed is:

1. A real core shape simulation fuel experiment method for acquiring experimental data by a simulation of a real reactor comprising:
filing an experimental vessel with a coolant;
arranging a simulation fuel rod so as to be covered with the coolant in the experimental vessel;
heating the simulation fuel rod;
measuring, as measurement data, critical heat flux, a surface temperature of a fuel rod, a mass velocity, and a temperature of the coolant, and outputting as output signals, the measurement data and a thermal equilibrium quality determined from the measurement data; and
predicting critical heat flux for the simulation fuel rod, wherein
the predicting the critical heat flux includes:
storing the output signals as experimental data into a storage unit;
reading the experimental data from the storage unit;
plotting the experimental data so as to obtain a correlation plot distribution;
loading a logistic function from the storage unit wherein the logistic function is Formula (1):

$$q'' = \frac{A}{1 + \exp(-K((1-x)-C))} \quad (1)$$

where q" is critical heat flux, x is the thermal equilibrium quality, and A, K, and C are coefficients;
calculating the coefficients A, K, and C such that the correlation plot distribution Z is approximated by the logistic function;
obtaining a critical heat flux correlation by inputting the coefficients A, K, and C to the logistic function and obtaining a curve of the critical heat flux correlation;
comparing the curve of the critical heat flux correlation with the correlation plot distribution;
outputting, as an output data, the critical heat flux correlation when the curve of the critical heat flux correlation and the correlation plot distribution are within a predetermined allowable range;
displaying the output critical heat flux correlation on a display unit;
wherein the thermal equilibrium quality x is expressed as $$x = \frac{h_g - h_{lsat}}{h_{fg}} \quad (2)$$

$h_g$ : enthalpy of coolant J/kg $h_{lsat}$ : enthalpy of saturated water J/kg $h_{fg}$ : latent heat J/kg.

2. A core fuel evaluation monitoring method for a reactor comprising:
   a measuring device that measures measurement data of the reactor, and
   a plant control device that controls the reactor,
   the method comprising:
   receiving the output data output from the real core shape simulation fuel experiment method according to claim 1;
   receiving an output signal from the measuring device;
   reading an initial condition of the reactor;
   performing reactor state analysis by an existing analysis code based on the measurement data obtained by analyzing the initial condition of the reactor and the output signal and acquiring the power, the pressure, the temperature, the mass velocity, and the core power distribution of the reactor;
   calculating a critical heat flux ratio as a minimum critical heat flux ratio, the critical heat flux ratio being a ratio between the critical heat flux (q") and an actual heat flux; and
   comparing the minimum critical heat flux ratio with an allowable limit value;
   determining to be safe when the minimum critical heat flux ratio is larger than the allowable limit value,
   wherein the critical heat flux correlation obtained in the real core shape simulation fuel experiment method is used for obtaining the critical heat flux ratio, and
   wherein the plant control device controls the reactor based on the safety evaluation.

\* \* \* \* \*